US008543102B2

(12) United States Patent
Hamada

(10) Patent No.: US 8,543,102 B2
(45) Date of Patent: Sep. 24, 2013

(54) WIRELESS BASE STATION APPARATUS, WIRELESS COMMUNICATION METHOD IN THE WIRELESS BASE STATION APPARATUS, AND WIRELESS COMMUNICATION SYSTEM

(75) Inventor: Seiji Hamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 12/977,265

(22) Filed: Dec. 23, 2010

(65) Prior Publication Data

US 2011/0159870 A1    Jun. 30, 2011

(30) Foreign Application Priority Data

Dec. 28, 2009 (JP) ................................. 2009-296619

(51) Int. Cl.
*H04W 24/00* (2009.01)

(52) U.S. Cl.
USPC ..................... 455/423; 455/550.1; 455/562.1; 455/567.1; 370/329; 370/337; 370/378

(58) Field of Classification Search
USPC ............... 455/423, 550.1; 370/378, 329, 337
See application file for complete search history.

(56) References Cited

U.S. PATENT DOCUMENTS

| | | | |
|---|---|---|---|
| 8,126,021 B2* | 2/2012 | Wang et al. ................... | 370/530 |
| 2002/0159431 A1 | 10/2002 | Moulsley et al. | |
| 2002/0173302 A1 | 11/2002 | Baker et al. | |
| 2006/0200722 A1 | 9/2006 | Braun | |
| 2009/0303978 A1* | 12/2009 | Pajukoski et al. ............. | 370/345 |

FOREIGN PATENT DOCUMENTS

| | | |
|---|---|---|
| JP | 2003-318804 | 11/2003 |
| JP | 2004-520750 | 7/2004 |
| JP | 2006-246457 | 9/2006 |
| JP | 2009-147747 | 7/2009 |

OTHER PUBLICATIONS

3GPP TS 36.211 V9.0.0 (Dec. 2009) 3rd Generation Partnership Project; Technical Specification Group Radio Access Network; Evolved Universal Terrestrial Radio Access (E-UTRA); Physical Channels and Modulation (Release 9) Dec. 10, 2009.
3GPP TS 36.212 V9.0.0 (Dec. 2009) 3rd Generation Partnership Project; Technical Specification Group Radio Access Network; Evolved Universal Terrestrial Radio Access (E-UTRA); Multiplexing and Channel Coding (Release 9) Dec. 10, 2009.
Notification of Reasons for Refusal dated May 14, 2013, from corresponding Japanese Application No. 2009-296619.

* cited by examiner

*Primary Examiner* — Ajit Patel
*Assistant Examiner* — Julio Perez
(74) *Attorney, Agent, or Firm* — Katten Muchin Rosenman LLP

(57) ABSTRACT

A wireless base station apparatus performing wireless communication with a mobile station apparatus includes: a transmission unit to transmit data to the mobile station apparatus; a reception unit to receive a delivery result for the data from the mobile station apparatus; and a control unit to determine whether reception processing through a first channel is performed or parallel reception processing through the first channel and a second channel is performed on the basis of a radio line quality between the wireless base station apparatus and the mobile station apparatus or an amount of processing in the reception unit if the transmission unit transmits a permission notification permitting the transmission through the first channel to the mobile station apparatus, where the reception unit performs the reception processing in accordance with the result of the determination to receive the delivery result transmitted through the first channel or the second channel.

13 Claims, 18 Drawing Sheets

WIRELESS BASE STATION APPARATUS, WIRELESS COMMUNICATION METHOD IN THE WIRELESS BASE STATION APPARATUS, AND WIRELESS COMMUNICATION SYSTEM

CROSS-REFERENCE TO RELATED APPLICATION

This application is based upon and claims the benefit of priority of the prior Japanese Patent Application No. 2009-296619, filed on Dec. 28, 2009, the entire contents of which are incorporated herein by reference.

FIELD

A certain aspect of the embodiments discussed herein relates to a wireless base station apparatus, a wireless communication method in the wireless base station apparatus, and a wireless communication system.

BACKGROUND

Long Term Evolution (LTE) is discussed in Third Generation Partnership Project (3GPP), which is a standardization organization for wireless communication systems. In the LTE, uplink user data is transmitted through Physical Uplink Shared Channel (PUSCH) and quality information, etc. are transmitted through Physical Uplink Control Channel (PUCCH).

Downlink user data is transmitted through Physical Downlink Shared Channel (PDSCH).

A technology called retransmission control has been adopted in the wireless communication systems. In the retransmission control, for example, a base station apparatus transmits user data and each mobile station apparatus transmits (feeds back) a delivery result (Acknowledgement (ACK) or Negative Acknowledgement (NACK)) indicating whether the user data is successfully received. The base station apparatus performs, for example, retransmission of the user data on the basis of the delivery result. The mobile station apparatus transmits the delivery result by using the PUSCH or the PUCCH in the retransmission control.

Since the PUSCH is shared between multiple mobile station apparatuses performing wireless communication, a certain mobile station apparatus cannot occupy the PUSCH. Accordingly, the wireless base station apparatus uses Physical Downlink Control Channel (PDCCH) to transmit a permission to transmit through the PUSCH and each mobile station apparatus can use the PUSCH upon reception of the transmission permission.

Refer to 3GPP TS 36.211 V9.0.0 (2009-12) 5.3 Physical uplink shared channel, 5.4 Physical uplink control channel, and 6.8 Physical downlink control channel and 3GPP TS 36.212 V9.0.0 (2009-12) 5.2 Uplink transport channels and control information.

SUMMARY

According to an aspect of an embodiment, a wireless base station apparatus performing wireless communication with at least one mobile station apparatus, the wireless base station apparatus includes: a transmission unit configured to transmit data to the mobile station apparatus; a reception unit configured to receive a delivery result for the data from the mobile station apparatus; and a control unit configured to determine whether reception processing through a first channel is performed or parallel reception processing through the first channel and a second channel is performed on the basis of a radio line quality between the wireless base station apparatus and the mobile station apparatus or an amount of processing in the reception unit if the transmission unit transmits a permission notification permitting the transmission through the first channel to the mobile station apparatus, wherein the reception unit performs the reception processing in accordance with the result of the determination to receive the delivery result transmitted through the first channel or the second channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will herein be described with reference to the attached drawings.

There are cases in which the mobile station apparatus cannot receive a permission to transmit through the PUSCH due to a change in the wireless communication environment despite the fact that the wireless base station apparatus has transmitted the permission to transmit through the PUSCH. In such a case, the mobile station apparatus cannot transmit the delivery result of user data (PDSCH) by using the PUSCH. The wireless base station apparatus cannot receive the delivery result through the PUSCH and determines that the mobile station apparatus does not successfully receive the user data to retransmit the user data. If the mobile station apparatus has successfully receive the user data that has been initially transmitted in such a case, the retransmission of the user data degrades the transmission efficiency (throughput) in the wireless communication system.

The wireless base station apparatus performs processing for the PUCCH and the PUSCH to all the mobile station apparatuses in order for each mobile station apparatus to transmit the delivery result through the PUSCH or the PUCCH. However, the amount of processing in the wireless base station apparatus is increased in the case in which the wireless base station apparatus performs the processing for both the PUSCH and the PUCCH, compared with a case in which the processing for either the PUSCH or the PUCCH is performed.

In order to resolve the above problem, it is an object of the present invention to provide a wireless base station apparatus, a wireless communication method in the wireless base station apparatus, and a wireless communication system capable of improving the throughput.

It is another object of the present invention to provide a wireless base station apparatus, a wireless communication method in the wireless base station apparatus, and a wireless communication system capable of reducing the amount of processing.

According to the present invention, it is possible to provide a wireless base station apparatus, a wireless communication method in the wireless base station apparatus, and a wireless communication system capable of improving the throughput. It is also possible to provide a wireless base station apparatus, a wireless communication method in the wireless base station apparatus, and a wireless communication system capable of reducing the amount of processing.

<First Embodiment>

Figure 1:
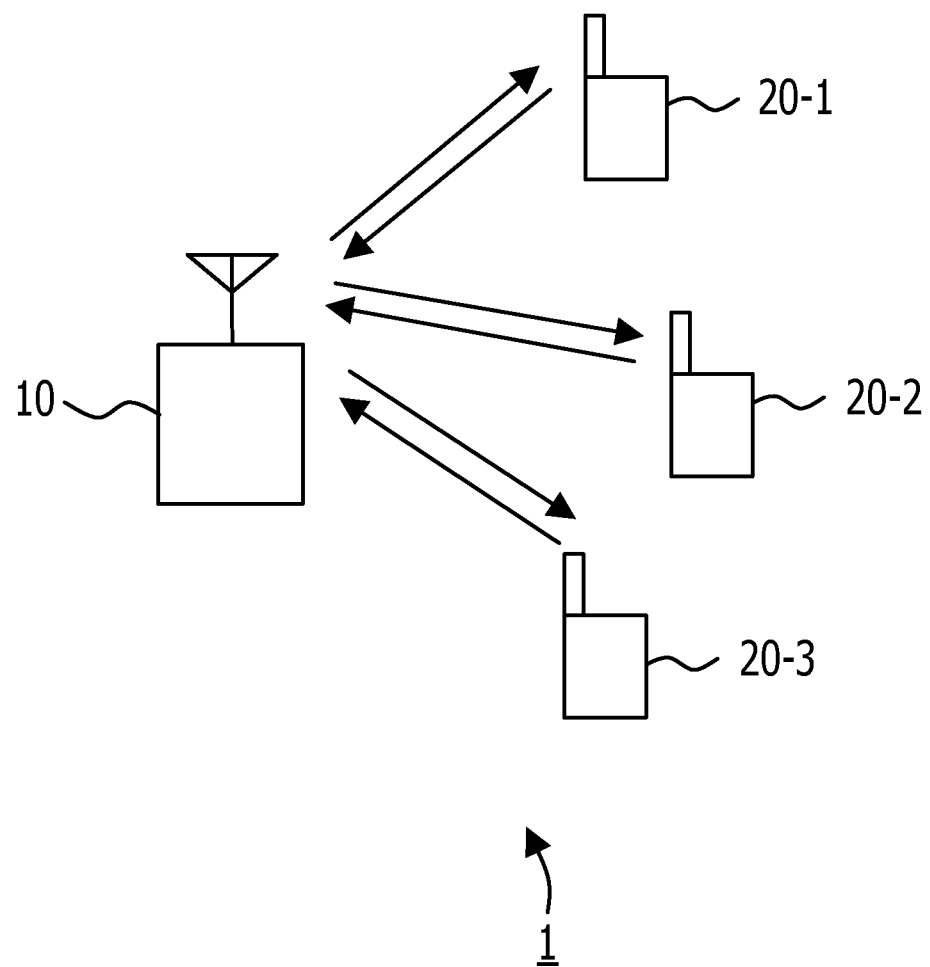
FIG. 1 illustrates an example of the configuration of a wireless communication system.

A first embodiment of the present invention will now be described. FIG. 1 illustrates an example of the configuration of a wireless communication system 1. The wireless communication system 1 includes a wireless base station apparatus (hereinafter referred to as a "base station") 10 and mobile station apparatuses (hereinafter referred to as "mobile stations") 20-1 to 20-3. The base station 10 perform wireless communication with the mobile stations 20-1 to 20-3 by using a downlink and the mobile stations 20-1 to 20-3 perform the wireless communication with the base station 10 by using an uplink.

Figure 2:
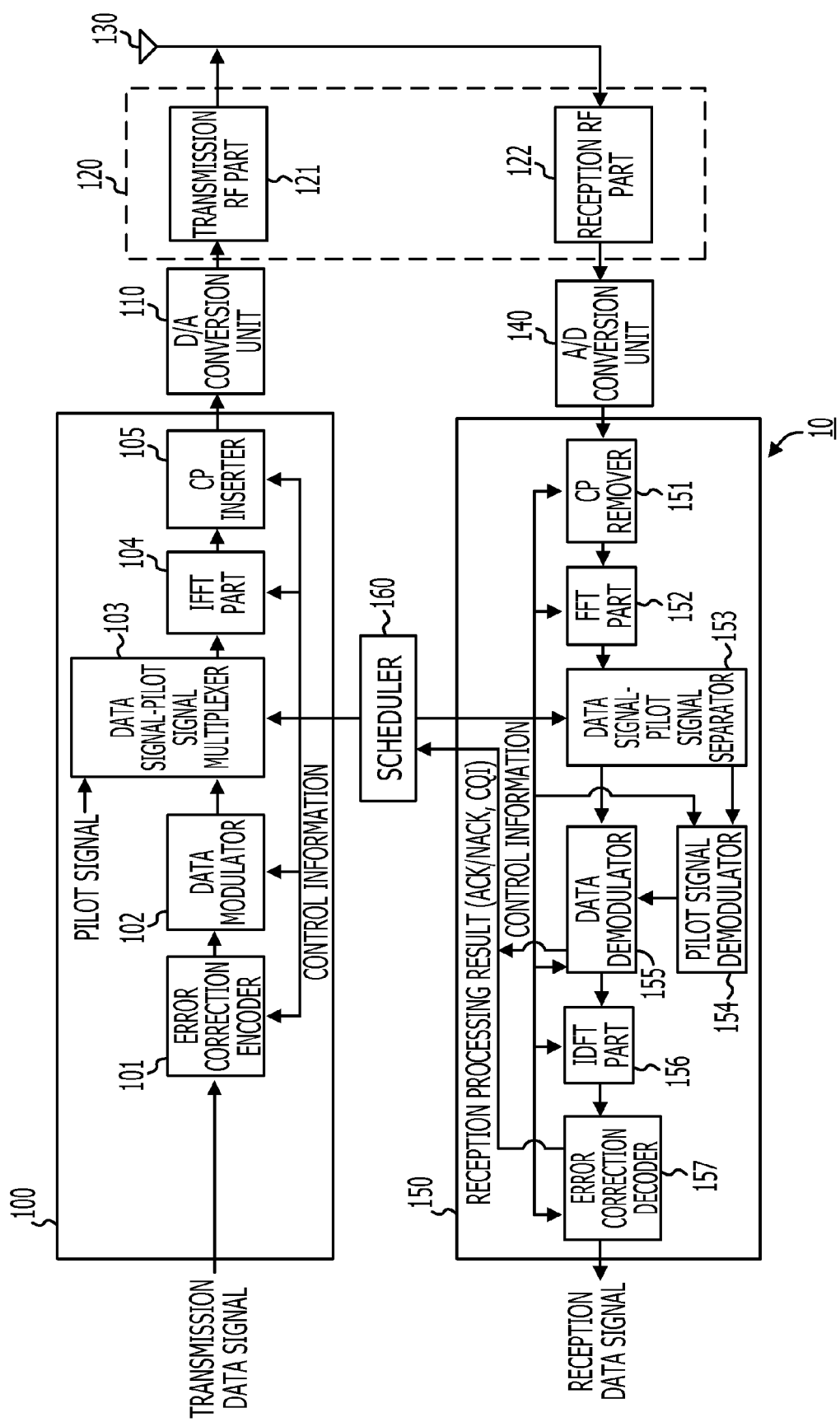
FIG. 2 illustrates an example of the configuration of a wireless base station apparatus according to a first embodiment of the present invention.

FIG. 2 illustrates an example of the configuration of the base station 10 according to the first embodiment. Referring to FIG. 2, the base station 10 includes a transmission unit 100, a digital-to-analog (D/A) conversion unit 110, a radio-frequency (RF) processing unit 120, an antenna 130, an analog-to-digital (A/D) conversion unit 140, a reception unit 150, and a scheduler 160.

The transmission unit 100 includes an error correction encoder 101, a data modulator 102, a data signal-pilot signal multiplexer 103, an Inverse Fast Fourier Transform (IFFT) part 104, and a cyclic prefix (CP) inserter 105. The transmission unit 100 transmits a data signal, etc. by multicarrier transmission, for example, Orthogonal Frequency Division Multiplexing (OFDM) with the objective of efficiently suppressing multipath fading in the downlink direction to perform high-speed communication. The transmission unit 100 performs processing to the data signal, etc. so that the data signal, etc. can be transmitted through the PDSCH and a control signal, etc. can be transmitted through the PDCCH.

The error correction encoder 101 performs error correction encoding to the transmission data signal at a certain encoding rate in accordance with control information from the scheduler 160.

The data modulator 102 modulates the data signal subjected to the error correction encoding by a certain modulation method in accordance with the control information from the scheduler 160.

The data signal-pilot signal multiplexer 103 allocates a pilot signal and the data signal, etc. subjected to the modulation to each resource block in accordance with the control information (for example, scheduling information) from the scheduler 160 to multiplex the pilot signal with the data signal. For example, the data signal-pilot signal multiplexer 103 performs the allocation to each resource block to allocate the data signal, etc. to a radio resource on the PDSCH and allocate the control information (or control signal) to a radio resource on the PDCCH.

The IFFT part 104 performs the Inverse Fast Fourier Transform (IFFT) to the output from the data signal-pilot signal multiplexer 103 to convert the multiplexed signal in a frequency-axis direction into a multiplexed signal in a time-axis direction. For example, the IFFT part 104 performs the IFFT in units of samples of a certain number N to convert the multiplexed signal into a discrete time signal and outputs the discrete time signal.

The CP inserter 105 copies, for example, the trailing M-number (N>M) samples in the output from the IFFT part 104 to make a cyclic prefix (CP) and inserts the CP at the beginning of the N-number samples.

The D/A conversion unit 110 converts the output (digital baseband signal) from the CP inserter 105 into an analog baseband signal.

The RF processing unit 120 includes a transmission RF part 121 and a reception RF part 122.

The transmission RF part 121 converts the baseband signal output from the D/A conversion unit 110 into a radio signal within a certain radio frequency band.

The antenna 130 transmits the radio signal output from the transmission RF part 121 to a mobile station 20. The antenna 130 receives a radio signal transmitted from the mobile station 20 and supplies the received radio signal to the reception RF part 122.

The reception RF part 122 converts the radio signal into a baseband signal and supplies the baseband signal to the A/D conversion unit 140.

The A/D conversion unit 140 converts the analog baseband signal into a digital signal and supplies the digital signal to the reception unit 150.

The reception unit 150 includes a CP remover 151, a Fast Fourier Transform (FFT) part 152, a data signal-pilot signal separator 153, a pilot signal demodulator 154, a data demodulator 155, an Inverse Discrete Fourier Transform (IDFT) part 156, and an error correction decoder 157. The reception unit 150 receives a signal transmitted by single carrier transmission, for example, Single Carrier-Frequency Division Multiple Access (SC-FDMA) with the objective of decreasing a Peak to Average Power Ratio (PAPR) to reduce the power consumption in the mobile station 20.

The CP remover 151 removes the CP from the digital baseband signal.

The FFT part 152 performs the Fast Fourier Transform (FFT) to the baseband signal subjected to the CP removal to convert the signal in the time-axis direction into a signal in the frequency-axis direction.

The data signal-pilot signal separator 153 separates a data signal and a pilot signal (or known signal) from the output from the FFT part 152 in accordance with control information (for example, scheduling information) from the scheduler 160. Specifically, for example, the data signal-pilot signal separator 153 extracts a data signal, etc. received by using a radio resource on the PUSCH and a variety of control information (or control signal), etc. received by using a radio resource on the PUCCH in accordance with the control information and supplies the extracted data signal and control information, etc. to the data demodulator 155.

The pilot signal demodulator 154 demodulates the pilot signal by a certain demodulation method in accordance with the control information from the scheduler 160.

The data demodulator 155 demodulates the data signal on the basis of the result of the demodulation in the pilot signal demodulator 154. When information about the radio line quality is transmitted through the PUCCH, the data demodulator 155 supplies the information about the radio line quality subjected to the demodulation to the scheduler 160.

The IDFT part 156 performs the Inverse Discrete Fourier Transform (IDFT) to the data signal subjected to the demodulation.

Figure 3A:
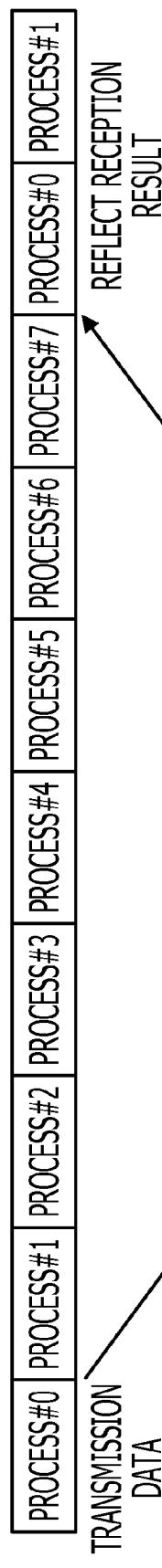
FIGS. 3A and 3B illustrate examples of timing in retransmission control.
Figure 3B:
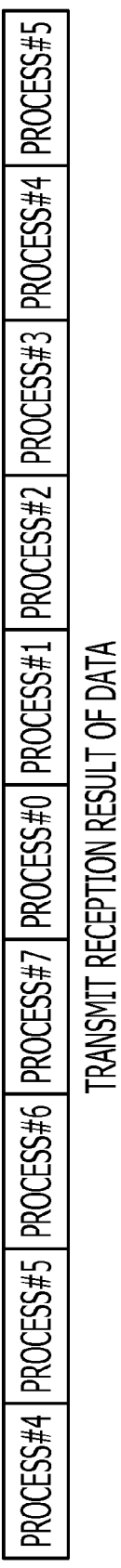

The error correction decoder 157 performs error correction decoding to the output from the IDFT part 156 to supply the data signal to other processors and supply a delivery result to the scheduler 160. For example, the delivery result is an Acknowledgement (ACK), which is an affirmative result, when the mobile station 20 successfully receives the data signal and is a Negative Acknowledgement (NACK), which is a negative result, when the mobile station 20 does not successfully receive the data signal. FIG. 3A illustrates an example of timing in the retransmission control in the base station 10 and FIG. 3B illustrates an example of timing in the retransmission control in the mobile station 20. The mobile station 20 determines in advance a time when the delivery result for data transmitted from the base station 10 is returned and, thus, the base station 10 can confirm the delivery result at the predetermined timing to transmit new data or retransmit the data.

The scheduler (or control unit) 160 supplies the encoding rate, etc. to the error correction encoder 101, etc. as the control information so that the error correction encoding, etc. are performed at the encoding rate, by the modulation method, etc. that are scheduled. In addition, the scheduler 160 supplies the demodulation method, etc. to the data demodulator 155, etc. as the control information so that the demodulation, etc. are performed by the demodulation method, at the encoding rate, etc. that are scheduled. Furthermore, the scheduler 160 holds the quality information output from the data demodulator 155 and the ACK or NACK output from the error correction decoder 157. The scheduler 160 transmits a new data signal or performs communication with another mobile station 20 when the delivery result is the ACK, and performs the scheduling so that the data signal is retransmitted to the mobile station 20 from which the NACK has been transmitted when the delivery result is the NACK.

Figure 4:
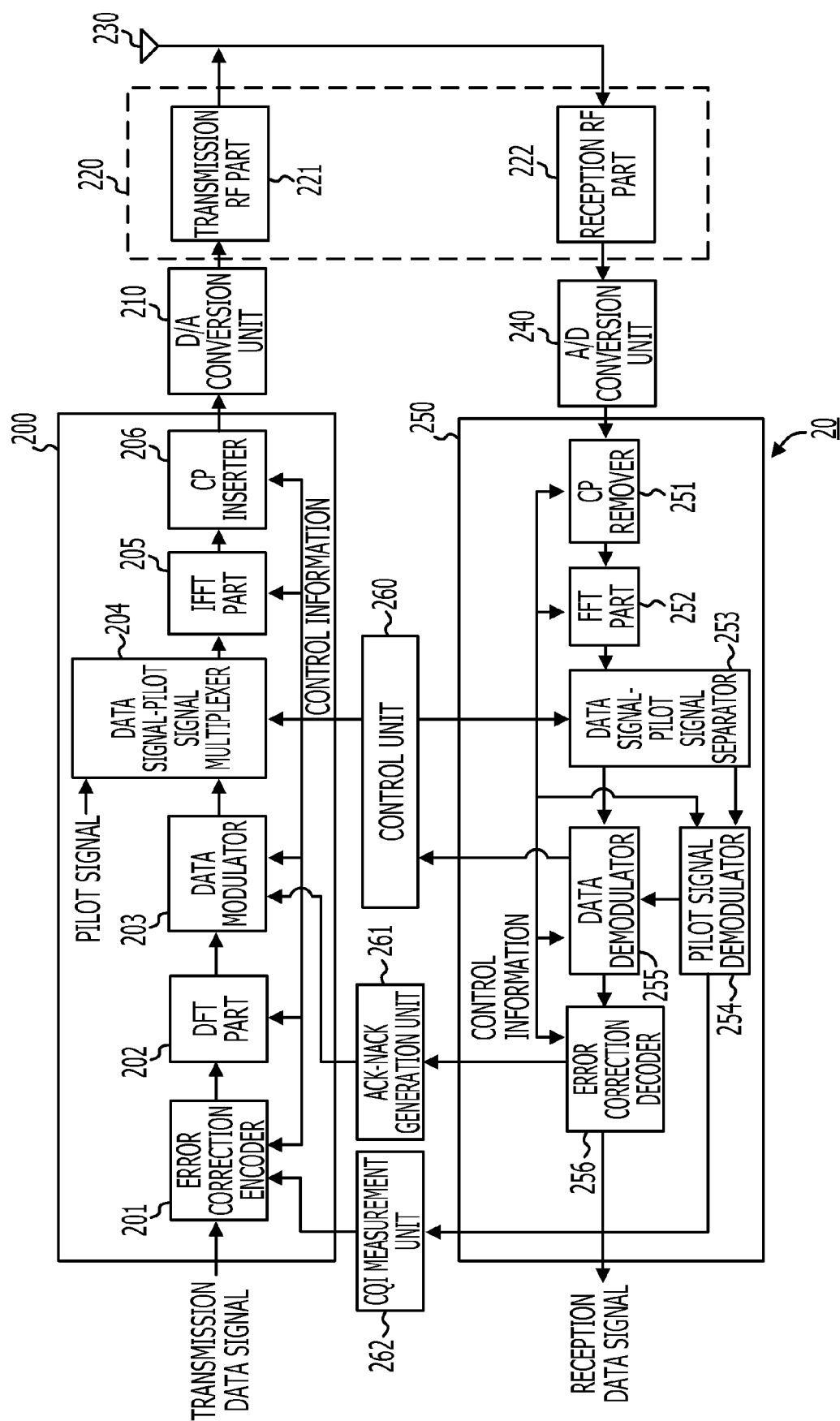
FIG. 4 illustrates an example of the configuration of a mobile station apparatus.

FIG. 4 illustrates an example of the configuration of the mobile station 20. Referring to FIG. 4, the mobile station 20 includes a transmission unit 200, a D/A conversion unit 210, an RF processing unit 220, an antenna 230, an A/D conversion unit 240, a reception unit 250, a control unit 260, an ACK-NACK generation unit 261, and a Channel Quality Indicator (CQI) measurement unit 262.

The transmission unit 200 includes an error correction encoder 201, a Discrete Fourier Transform (DFT) part 202, a data modulator 203, a data signal-pilot signal multiplexer 204, an IFFT part 205, and a CP inserter 206.

The error correction encoder 201 performs the error correction encoding to a transmission data signal transmitted in the uplink direction and a Channel Quality Indicator (CQI) output from the CQI measurement unit 262 in accordance with control information from the control unit 260.

The DFT part 202 performs the Discrete Fourier Transform (DFT) to the data signal, etc. subjected to the error correction encoding in accordance with the control information from the control unit 260.

The data modulator 203 modulates the data signal, etc. subjected to the DFT and the ACK, the NACK, etc. output from the ACK-NACK generation unit 261 in accordance with the control information from the control unit 260.

The data signal-pilot signal multiplexer 204 multiplexes the data signal, etc. subjected to the modulation with a pilot signal in accordance with the control information from the control unit 260. The IFFT part 205 performs the IFFT to the data signal, etc. subjected to the multiplexing. Specifically, for example, the data signal-pilot signal multiplexer 204 allocates the data signal, the ACK, or the NACK to a radio resource on the PUSCH and allocates the CQI to a radio resource on the PUCCH or the PUSCH in accordance with the control information (or scheduling information). Accordingly, the mobile station 20 can use the PUSCH to transmit the ACK or the NACK as part of the data signal and can use the PUSCH or the PUCCH to transmit the CQI.

The CP inserter 206 inserts the CP in the output from the IFFT part 205 in accordance with the control information from the control unit 260.

The D/A conversion unit 210 converts the output from the CP inserter 206 into an analog baseband signal. A transmission RF part 221 in the RF processing unit 220 converts the baseband signal output from the D/A conversion unit 210 into a radio signal within a certain radio frequency band and outputs the radio signal resulting from the conversion. The antenna 230 transmits the radio signal output from the transmission RF part 221 to the base station 10. The antenna 230 receives a radio signal transmitted from the base station 10 and supplies the received radio signal to a reception RF part 222 in the RF processing unit 220.

The reception RF part 222 converts the radio signal into a baseband signal. The A/D conversion unit 240 converts the analog baseband signal into a digital signal.

The reception unit 250 includes a CP remover 251, an FFT part 252, a data signal-pilot signal separator 253, a pilot signal demodulator 254, a data demodulator 255, and an error correction decoder 256.

The CP remover 251 removes the CP from the output from the A/D conversion unit 240. The FFT part 252 performs the FFT to the baseband signal subjected to the CP removal.

The data signal-pilot signal separator 253 separates a data signal and a pilot signal from the output from the FFT part 252. Specifically, for example, the data signal-pilot signal separator 253 extracts a data signal, etc. received through the PDSCH and a control signal, etc. received through the PDCCH in accordance with the control information (or scheduling information) and supplies the extracted data signal and control signal, etc. to the data demodulator 255.

The pilot signal demodulator 254 demodulates the pilot signal and supplies the pilot signal subjected to the demodulation to the CQI measurement unit 262.

The data demodulator 255 demodulates the data signal on the basis of the result of the demodulation of the pilot signal. In addition, the data demodulator 255 supplies the control signal subjected to the demodulation transmitted through the PDCCH to the control unit 260.

The error correction decoder 256 performs the error correction decoding to the data signal subjected to the demodulation. The error correction decoder 256 supplies the result of the error correction decoding (for example, the result of Cyclic Redundancy Check (CRC)) to the ACK-NACK generation unit 261.

The control unit 260 controls the error correction encoder 201, etc. on the basis of the control information for the uplink or the downlink included in the control signal. Specifically, for example, the control unit 260 supplies the encoding rate, the modulation method, etc. to the error correction encoder 201, the data modulator 203, etc. as the control information. The control unit 260 supplies the demodulation method, etc. to the data demodulator 255, etc. as the control information. The control information included in the control signal is scheduled by, for example, the scheduler 160 in the base station 10.

The ACK-NACK generation unit 261 generates the ACK or the NACK on the basis of the result of the error correction decoding output from the error correction decoder 256. Specifically, for example, the ACK-NACK generation unit 261 generates the ACK when the CRC result indicating that the error correction decoding is successfully performed is received and generates the NACK when the CRC result indicating that the error correction decoding is not successfully performed is received. The ACK-NACK generation unit 261 supplies the ACK or the NACK to the data modulator 203.

The CQI measurement unit 262 measures the radio line quality in the downlink direction on the basis of the pilot signal, generates the CQI, which is an index indicating the radio line quality, and supplies the CQI to the error correction encoder 201.

Figure 5:
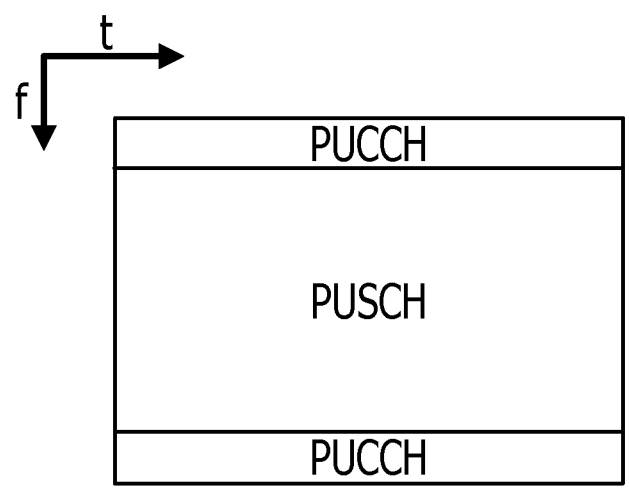
FIG. 5 illustrates an example of the structure of a radio frame.

An example of the structure of an uplink radio frame including the PUSCH and the PUCCH will now be described. FIG. 5 illustrates an example of the structure of such a radio frame. Referring to FIG. 5, the horizontal axis represents the time-axis direction and the vertical axis represents the frequency-axis direction. The PUSCH is a physical channel through which, for example, user data is transmitted and which can be used by the mobile station 20 by permission of the base station 10. The PUCCH is a physical channel thorough which, for example, the control signal (or the control information) is transmitted and which is allocated to each mobile station 20 in advance. As illustrated in FIG. 5, the PUCCHs and the PUSCH are arranged on radio resources having different frequencies. The PUCCHs are arranged on both ends of the system frequency band. The PUCCHs are arranged on both ends in order to reduce the characteristic degradation due to the multipath fading to improve the reception quality of the PUCCH in the base station 10.

Figure 6:
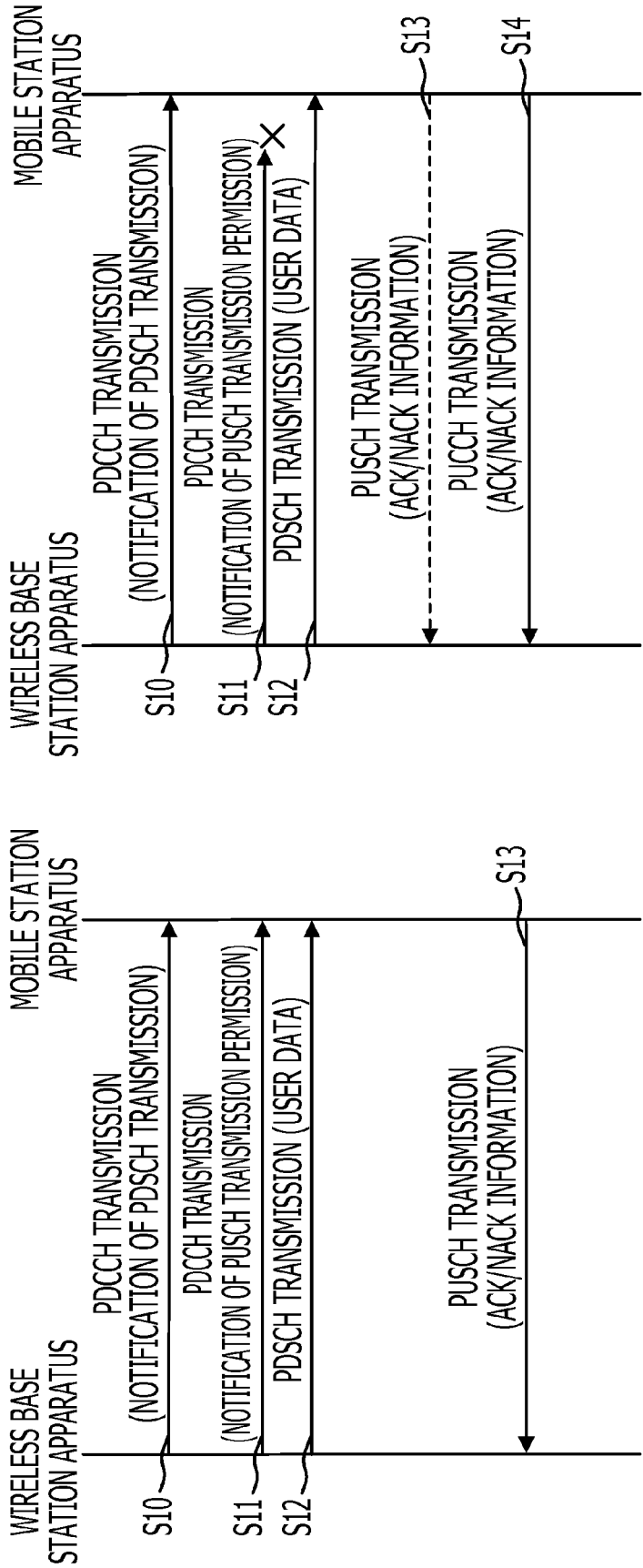
FIGS. 6A and 6B illustrate exemplary sequences in transmission of a delivery result.

Exemplary operations will now be described. FIGS. 6A and 6B illustrate exemplary sequences in the transmission of a delivery result.

FIG. 6A illustrates an exemplary sequence when the mobile station 20 uses the PUSCH to transmit a delivery result. Referring to FIG. 6A, the base station 10 uses the PDCCH to notify the mobile station 20 that user data (or a data signal) is to be transmitted through the PDSCH (S10). The base station 10 uses the PDSCH to transmit the user data (S12).

When the base station 10 uses the PDCCH to transmit a permission to transmit through the PUSCH and the mobile station 20 receives the transmission permission (S11), the mobile station 20 uses the PUSCH to transmit a delivery result for the downlink user data (PDSCH) (S13). For example, in the base station 10, the scheduler 160 generates a permission to transmit through the PUSCH for the mobile station 20 and supplies the transmission permission to the data signal-pilot signal multiplexer 103 to transmit the transmission permission. Upon reception of the transmission permission from the data demodulator 255, the control unit 260 in the mobile station 20 controls the data signal-pilot signal multiplexer 204 to allocate the ACK or the NACK to a radio resource on the PUSCH.

FIG. 6B illustrates an exemplary sequence when the mobile station 20 cannot receive a permission to transmit through the PUSCH. There is a case in which the mobile station 20 cannot receive a permission to transmit through the PUSCH due to, for example, a change in the wireless communication environment despite the fact that the base station 10 has transmitted the permission to transmit through the PUSCH. In such a case, the mobile station 20 cannot use the PUSCH to transmit the delivery result for the downlink user data (PDSCH).

Accordingly, when the mobile station 20 cannot receive the permission to transmit through the PUSCH, the mobile station 20 uses the PUCCH to transmit the delivery result (S14). For example, when the delivery result is not confirmed, the control unit 260 in the mobile station 20 controls the data signal-pilot signal multiplexer 204 so that the ACK or the NACK is allocated to a radio resource on the PUCCH.

The mobile station 20 uses the PUSCH or the PUCCH to transmit the delivery result for the downlink user data (PDSCH). The same applies to the embodiments described below.

Figure 7:
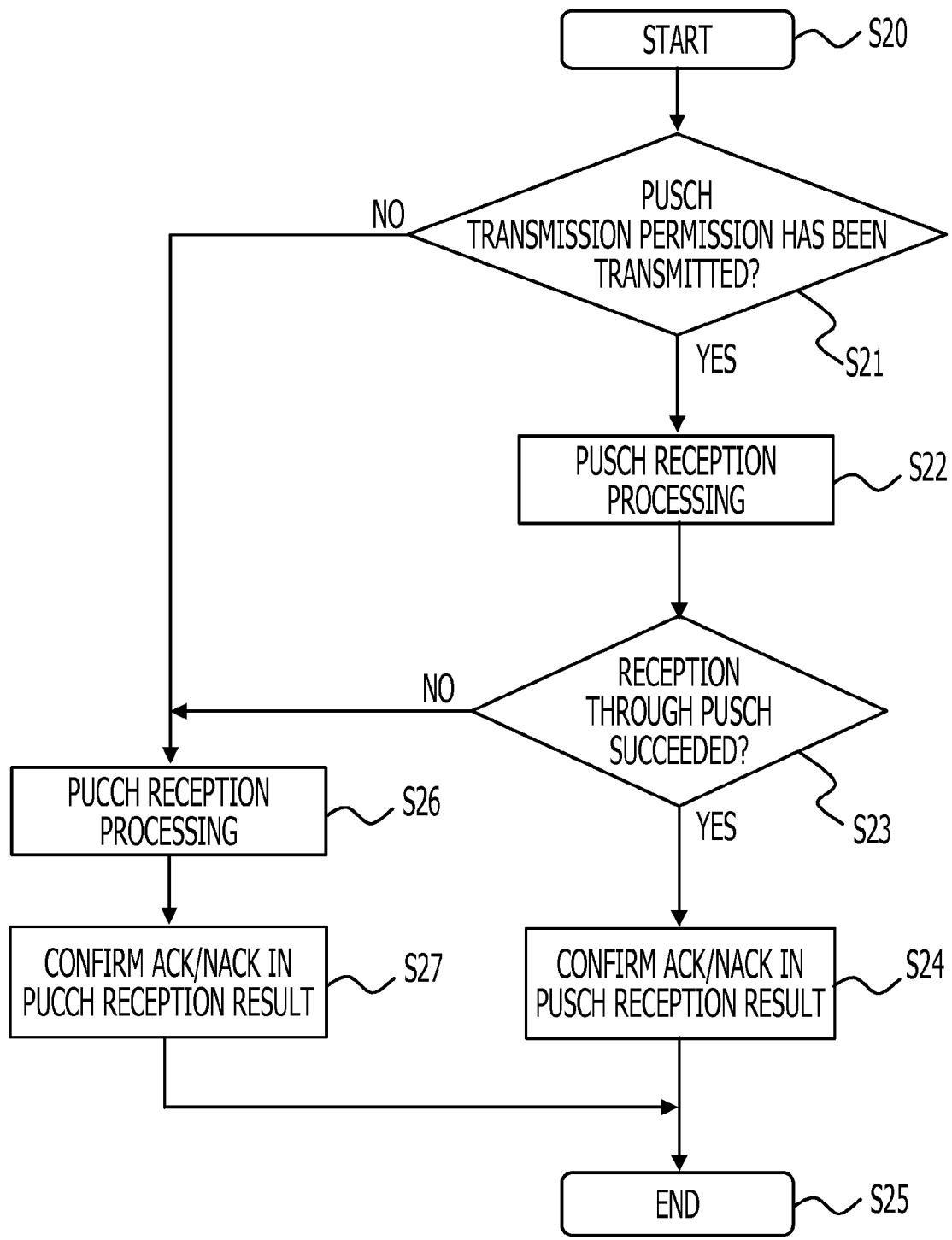
FIG. 7 illustrates an exemplary operational process in the wireless base station apparatus in the first embodiment.

Operations in the base station 10 will now be described. FIG. 7 illustrates an exemplary operational process in the base station 10 in the first embodiment. It is assumed that the base station 10 has transmitted a data signal (or user data) (PDSCH) to the mobile station 20.

Referring to FIG. 7, in Operation S20, the base station 10 starts the process. In Operation S21, the base station 10 determines whether a permission to transmit through the PUSCH has been transmitted to the mobile station 20. For example, since the scheduler 160 determines the permission to transmit through the PUSCH and supplies the transmission permission to the data modulator 102, the determination in Operation S21 can be based on the determination or the output in the scheduler 160.

If the permission to transmit through the PUSCH has been transmitted to the mobile station 20 (YES in Operation S21, and S11 in FIG. 6A), in Operation S22, the base station 10 performs reception processing to the data signal, etc. transmitted from the mobile station 20 through the PUSCH.

In Operation S23, the base station 10 determines whether the data signal, etc. transmitted through the PUSCH is successfully received. For example, the scheduler 160 performs the determination on the basis of the CRC result output from the error correction decoder 157.

If the data signal, etc. transmitted through the PUSCH is successfully received (YES in Operation S23), in Operation S24, the base station 10 confirms the ACK or the NACK transmitted through the PUSCH along with the data signal.

For example, the scheduler 160 receives the ACK or the NACK supplied from the error correction decoder 157 to perform the confirmation.

In Operation S25, the base station 10 terminates the process.

If the data signal, etc. transmitted through the PUSCH is not successfully received (NO in Operation S23), in Operation S26, the base station 10 performs the reception processing to the signal, etc. transmitted through the PUCCH. There is a case in which the mobile station 20 cannot receive a permission to transmit through the PUSCH due to a change in the communication environment even if the base station 10 has transmitted the permission to transmit through the PUSCH. Since the mobile station 20 uses the PUCCH to transmit a delivery result (S14 in FIG. 6B) if the mobile station 20 cannot receive the permission to transmit through the PUSCH, the base station 10 performs the reception processing to the signal, etc. received through the PUCCH.

In Operation S27, the base station 10 confirms the ACK or the NACK transmitted through the PUCCH along with the signal, etc. For example, the scheduler 160 receives the ACK or the NACK supplied from the data demodulator 155 to perform the confirmation. In Operation S25, the base station 10 terminates the process.

If the permission to transmit through the PUSCH has not been transmitted to the mobile station 20 (NO in Operation S21), in Operation S26, the base station 10 performs the reception processing to the signal, etc. transmitted through the PUCCH. In Operation S27, the base station 10 confirms the ACK or the NACK transmitted through the PUCCH along with the signal, etc. In this case, since the base station 10 has not transmitted the permission to transmit through the PUSCH to the mobile station 20 (NO in Operation S21), the mobile station 20 uses the PUCCH to transmit the delivery result (S14 in FIG. 6B). The base station 10 receives the delivery result received through the PUCCH. In Operation S25, the base station 10 terminates the process.

In the exemplary operational process in FIG. 7, the base station 10 performs the reception processing through the PUCCH (Operation S26) if the reception processing through the PUSCH is performed (Operation S22) but the data signal, etc. transmitted through the PUSCH is not successfully received. Processing in which the reception processing through the PUCCH is performed after the reception processing through the PUSCH is hereinafter referred to as serial processing. Since the base station 10 can perform the serial processing to receive the delivery result transmitted through either the PUSCH or the PUCCH, it is not necessary to perform the data retransmission because of the delivery result that cannot be received. Accordingly, it is possible to improve the throughput in the wireless communication system 1.

Figure 8:
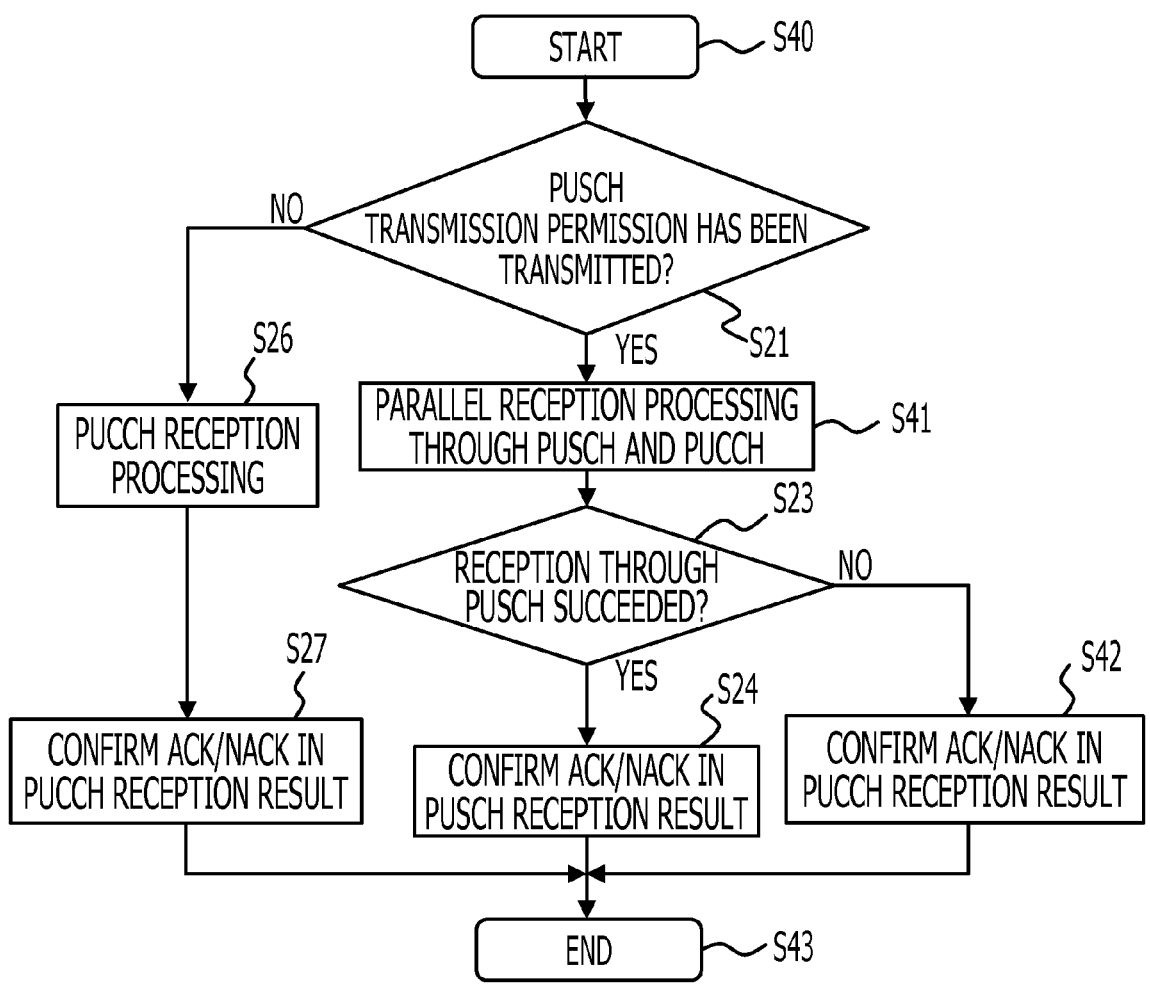
FIG. 8 illustrates another exemplary operational process in the wireless base station apparatus in the first embodiment.

The base station 10 may perform the reception processing through the PUSCH and the reception processing through the PUCCH in parallel (or simultaneously), instead of the serial processing. Such processing is hereinafter referred to as parallel processing. Since the reception processing through the PUCCH and the reception processing through the PUSCH can be performed in parallel in the parallel processing, it is possible to reduce the time before the base station 10 confirms the delivery result, compared with the serial processing. FIG. 8 illustrates an exemplary operational process in the parallel processing in the base station 10.

Referring to FIG. 8, in Operation S40, the base station 10 starts the process. In Operation S21, the base station 10 determines whether a permission to transmit through the PUSCH has been transmitted to the mobile station 20.

If a permission to transmit through the PUSCH has been transmitted to the mobile station 20 (YES in Operation S21), in Operation S41, the base station 10 performs the reception processing of a data signal, etc. transmitted through the PUSCH and the reception processing of a signal, etc. transmitted through the PUCCH in parallel. For example, the pilot signal demodulator 154, the data demodulator 155, the IDFT part 156, and the error correction decoder 157 may perform Operation S41 at a processing speed allowing the data signals, etc. transmitted at different frequencies to be received in parallel. Alternatively, two or more pilot signal demodulators 154, two or more data demodulators 155, two or more IDFT parts 156, and two or more error correction decoders 157 may be arranged in parallel and each pilot signal demodulator 154, etc. may perform the processing in parallel.

Figure 9:
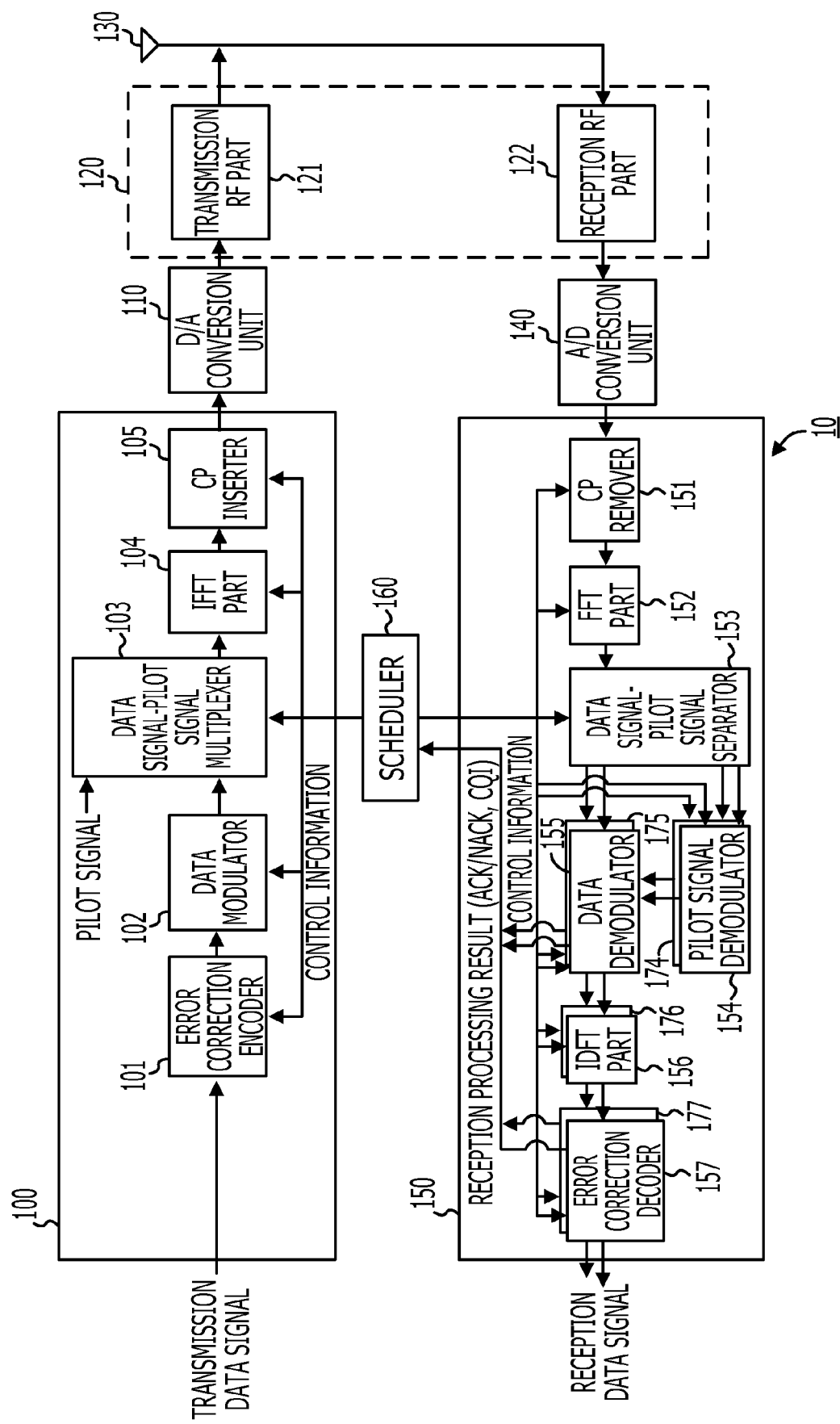
FIG. 9 illustrates another example of the configuration of the wireless base station apparatus according to the first embodiment.

FIG. 9 illustrates an example of the configuration of the base station 10 when the pilot signal demodulators 154, etc. are arranged in parallel. Referring to FIG. 9, the base station 10 further includes a second pilot signal demodulator 174, a second data demodulator 175, a second IDFT part 176, and a second error correction decoder 177, in addition to the components in FIG. 2. For example, the pilot signal demodulator 154, the data demodulator 155, the IDFT part 156, and the error correction decoder 157 perform the reception processing to the data signal, etc. transmitted through the PUSCH, and the second pilot signal demodulator 174, the second data demodulator 175, the second IDFT part 176, and the second error correction decoder 177 perform the reception processing to the control signal, etc. transmitted through the PUCCH. The pilot signal demodulator 154, the data demodulator 155, the IDFT part 156, and the error correction decoder 157 may perform the reception processing to the control signal, etc. transmitted through the PUCCH, and the second pilot signal demodulator 174, the second data demodulator 175, the second IDFT part 176, and the second error correction decoder 177 may perform the reception processing to the data signal, etc. transmitted through the PUSCH.

Referring back to FIG. 8, in Operation S23, the base station 10 determines whether the data signal, etc. transmitted through the PUSCH is successfully received. If the data signal, etc. transmitted through the PUSCH is successfully received (YES in Operation S23), in Operation S24, the base station 10 confirms the ACK or the NACK received through the PUSCH.

In Operation S43, the base station 10 terminates the process.

If the data signal, etc. transmitted through the PUSCH is not successfully received (NO in Operation S23), in Operation S42, the base station 10 confirms the delivery result received through the PUCCH. Since the base station 10 has performed the reception processing through the PUCCH in Operation S41, it is sufficient for the base station 10 to only confirm the delivery result received through the PUCCH if the data signal, etc. transmitted through the PUSCH is not successfully received. In Operation S43, the base station 10 terminates the process.

If a permission to transmit through the PUSCH has not been transmitted to the mobile station 20 (NO in Operation S21), the base station 10 performs the reception processing through the PUCCH in Operation S26 and confirms the delivery result in Operation S27, as in the serial processing. In Operation S43, the base station 10 terminates the process.

As described above, it is possible to reduce the time before the base station 10 confirms the delivery result in the parallel processing, compared with the serial processing. Consequently, the base station 10 can transmit or receive a larger amount of data signal, etc. in response to the reduced time before the delivery result is confirmed and round trip time (RTT) can be improved in the entire wireless communication system 1.

<Second Embodiment>

A second embodiment of the present invention will now be described. In the second embodiment, determination of whether the reception processing through the PUSCH is performed or the parallel reception processing through the PUSCH and the PUCCH is performed is based on the radio line quality of the downlink. Since the parallel reception processing is not performed depending on the case in the second embodiment, it is possible to reduce the amount of processing and to further improve the throughput, compared with the parallel processing in the first embodiment.

Figure 10:
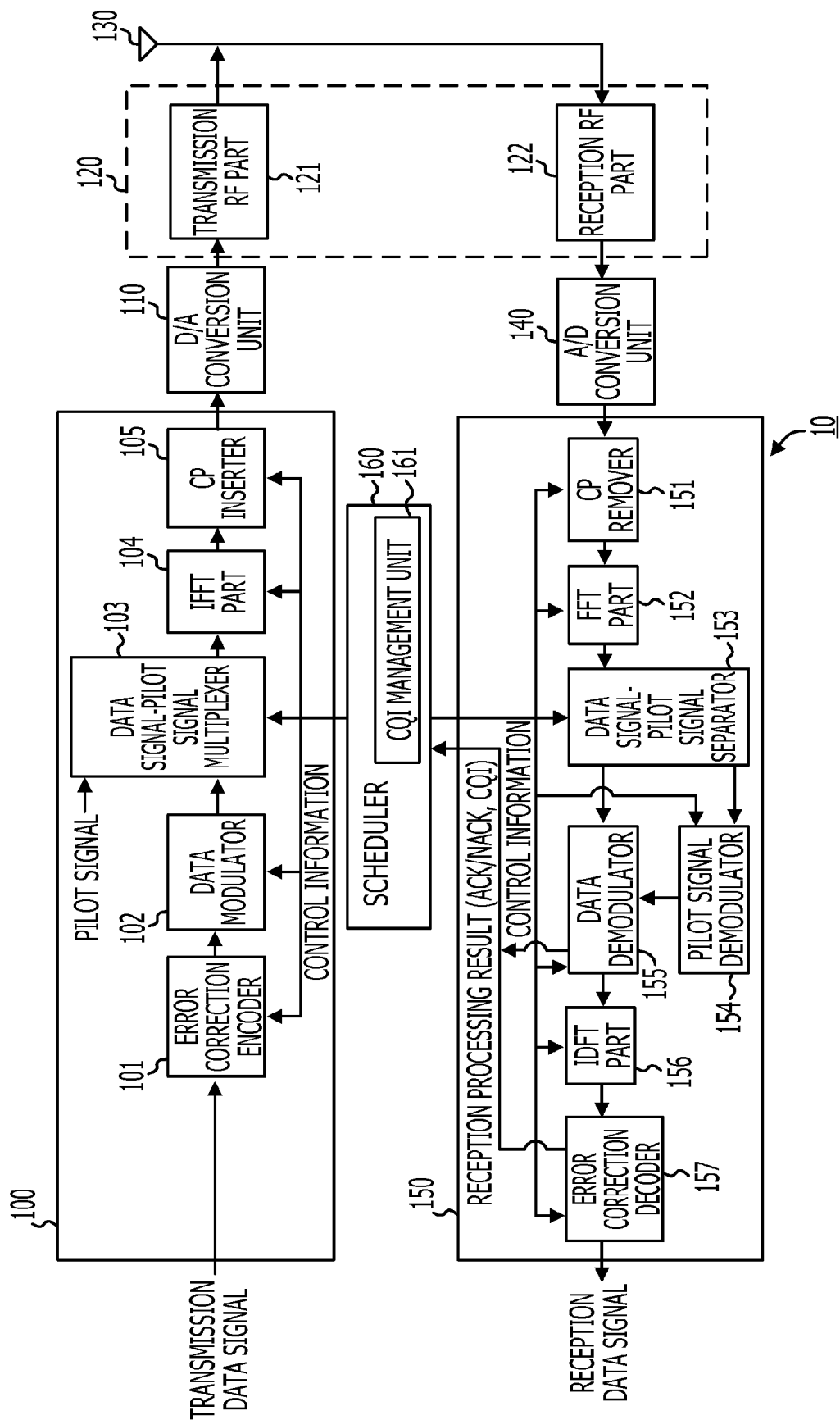
FIG. 10 illustrates an example of the configuration of a wireless base station apparatus according to a second embodiment of the present invention.

FIG. 10 illustrates an example of the configuration of the base station 10 according to the second embodiment. The base station 10 further includes a CQI management unit 161 in the scheduler 160, in addition to the components in FIG. 2.

The CQI management unit 161 holds the radio line quality (for example, the CQI) of the downlink transmitted from the mobile station 20 and compares the radio line quality with a threshold value CQIth that is held in advance. The scheduler 160 performs processing described below on the basis of the result of the comparison. The mobile station 20 transmits the CQI through the PUSCH or the PUCCH.

The same example of the configuration and the same exemplary sequence as those in the first embodiment, illustrated in FIG. 4 and FIGS. 6A and 6B, are applied to the mobile station 20 in the second embodiment. It is assumed that the base station 10 has transmitted a data signal (PDSCH) to the mobile station 20.

Figure 11:
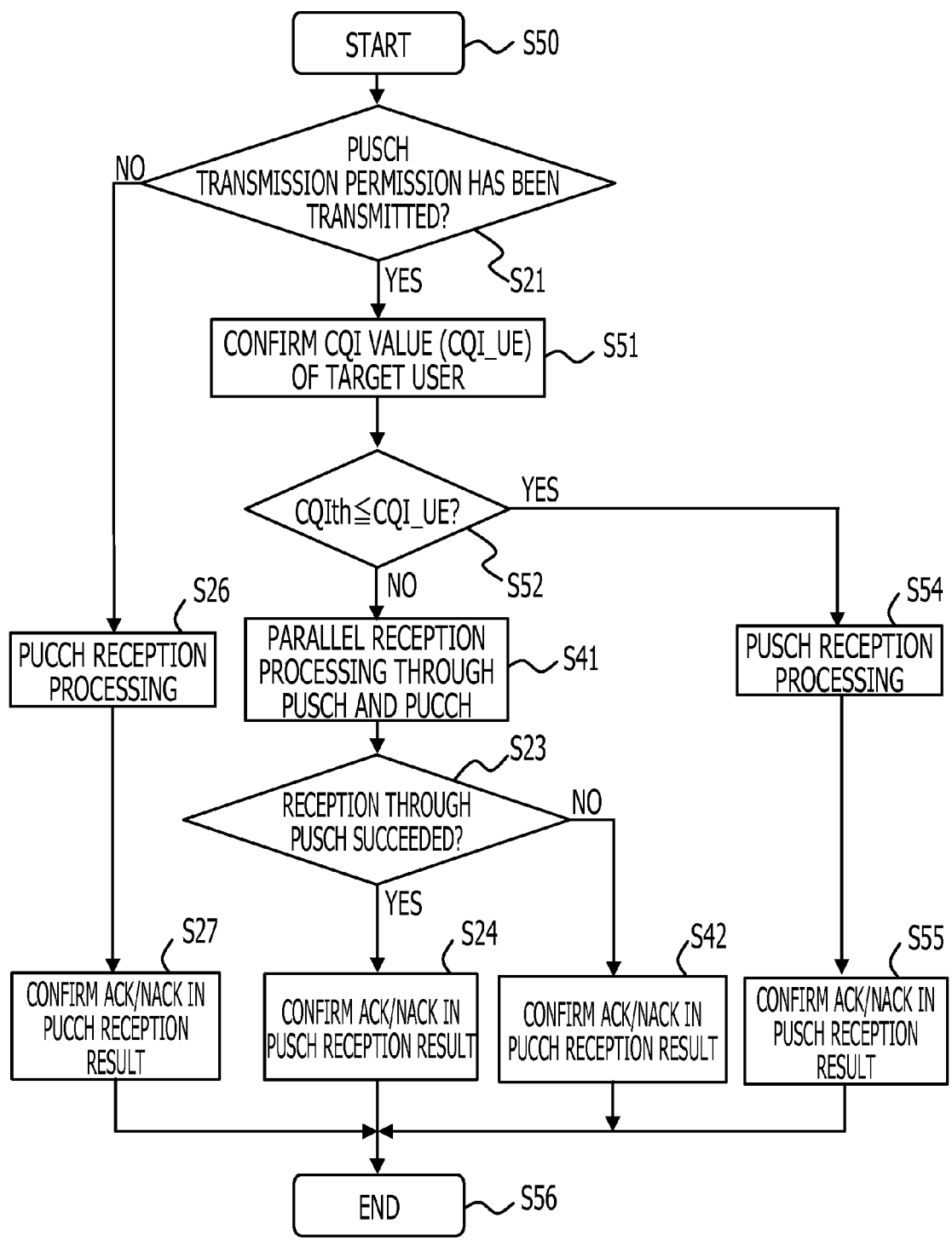
FIG. 11 illustrates an exemplary operational process in the wireless base station apparatus in the second embodiment.

FIG. 11 illustrates an exemplary operational process in the base station 10 in the second embodiment. Referring to FIG. 11, in Operation S50, the base station 10 starts the process. In Operation S21, the base station 10 determines whether a permission to transmit through the PUSCH has been transmitted to the mobile station 20.

If a permission to transmit through the PUSCH has been transmitted to the mobile station 20 (YES in Operation S21), in Operation S51, the base station 10 confirms the CQI value (CQI_UE) of the mobile station 20 to which the transmission permission has been transmitted. For example, the CQI measurement unit 262 in the mobile station 20 measures (estimates) the CQI of the downlink on the basis of a pilot signal and transmits the measured (estimated) CQI to the base station 10 as the CQI value (CQI_UE). The CQI management unit 161 receives the CQI value (CQI_UE) from the error correction decoder 157 to confirm the CQI value.

In Operation S52, the base station 10 determines whether the CQI value (CQI_UE) is higher than or equal to the threshold value CQIth. For example, the CQI management unit 161 performs the determination.

If the CQI value (CQI_UE) is higher than or equal to the threshold value CQIth (YES in Operation S52), in Operation S54, the base station 10 performs the reception processing to the data signal, etc. transmitted through the PUSCH. When the radio line quality of the downlink is higher than or equal to a certain value, the radio line quality of the downlink between the base station 10 and the mobile station 20 is better than that in the case in which the CQI value (CQI_UE) is lower than the threshold value CQIth. Accordingly, the probability of the mobile station 20 receiving the permission to transmit through the PUSCH is higher than in the case where the CQI value (CQI_UE) is lower than the threshold value CQIth. Thus, the base station 10 anticipates that the mobile station 20 transmits the delivery result through the PUSCH to perform the reception processing through the PUSCH.

In Operation S55, the base station 10 confirms the ACK or the NACK received through the PUSCH. In Operation S56, the base station 10 terminates the process.

If the CQI value (CQI_UE) is lower than the threshold value CQIth (NO in Operation S52), the base station 10 performs the parallel processing, as in the first embodiment. When the radio line quality of the downlink is lower than a certain value, the radio line quality of the downlink is not better than the case in which the CQI value (CQI_UE) is higher than or equal to the threshold value CQIth and, thus, the base station 10 cannot determine whether the permission to transmit through the PUSCH is received by the mobile station 20. In such a case, in Operation S41, the base station 10 performs the parallel reception processing through the PUSCH and the PUCCH to confirm the delivery result at an early stage.

After the parallel reception processing in Operation S41, in Operation S23, the base station 10 determines whether the data signal, etc. transmitted through the PUSCH is successfully received. If the data signal, etc. transmitted through the PUSCH is successfully received (YES in Operation S23), in Operation S24, the base station 10 confirms the ACK or the NACK received through the PUSCH. In operation S56, the base station 10 terminates the process.

If the data signal, etc. transmitted through the PUSCH is not successfully received (NO in Operation S23), in Operation S42, the base station 10 anticipates that the mobile station 20 uses the PUCCH to transmit the delivery result and confirms the ACK or the NACK received through the PUCCH. In Operation S56, the base station 10 terminates the process.

If a permission to transmit through the PUSCH has not been transmitted to the mobile station 20 (NO in Operation S21), in Operation S26, the base station 10 performs the reception processing to the signal, etc. received through the PUCCH. In Operation S27, the base station 10 confirms the ACK or the NACK transmitted through the PUCCH. In Operation S56, the base station 10 terminates the process.

Then, the base station 10 performs, for example, transmission of new data when the ACK is confirmed and retransmits the data to the mobile station 20 when the NACK is confirmed.

As described above, since the parallel reception processing through the PUCCH and the PUSCH is not performed (the process goes to Operation S54 if the determination in Operation S52 is affirmative) if the radio line quality of the downlink is higher than or equal to a certain value in the wireless communication system 1, it is possible to reduce the amount of processing, compared with the parallel processing in the first embodiment. In other words, since the base station 10 does not perform the reception processing through the PUCCH and the PUSCH depending on the case, the amount of processing can be reduced, compared with the case in which the reception processing through the PUCCH and the PUSCH are constantly performed. Accordingly, the base station 10 can perform another processing in response to the reduced amount of processing. For example, when the amount of data to be processed is restricted by the amount of processing necessary to perform the parallel processing in the related art in the base station 10, it is possible to transmit or receive a larger amount of data signal, etc. in response to the reduced amount of processing. As a result, the throughput in the entire wireless communication system 1 is improved. In addition, it is possible to reduce the cost and the power consumption owing to the reduced amount of processing in the base station 10, compared with the parallel processing. Furthermore, in the base station 10 in the second embodiment, the time before the delivery result is confirmed is reduced, compared with the serial processing, and a larger amount of data signal, etc. can be transmitted or received in response to the reduced amount of time. As a result, it is possible to improve the round trip time.

In the parallel reception processing, the pilot signal demodulator 154, the data demodulator 155, the IDFT part 156, and the error correction decoder 157 in the base station 10 perform the processing at a processing speed allowing the data signals, etc. transmitted through the PUSCH and the PUCCH at different frequencies to be received in parallel.

Figure 12:
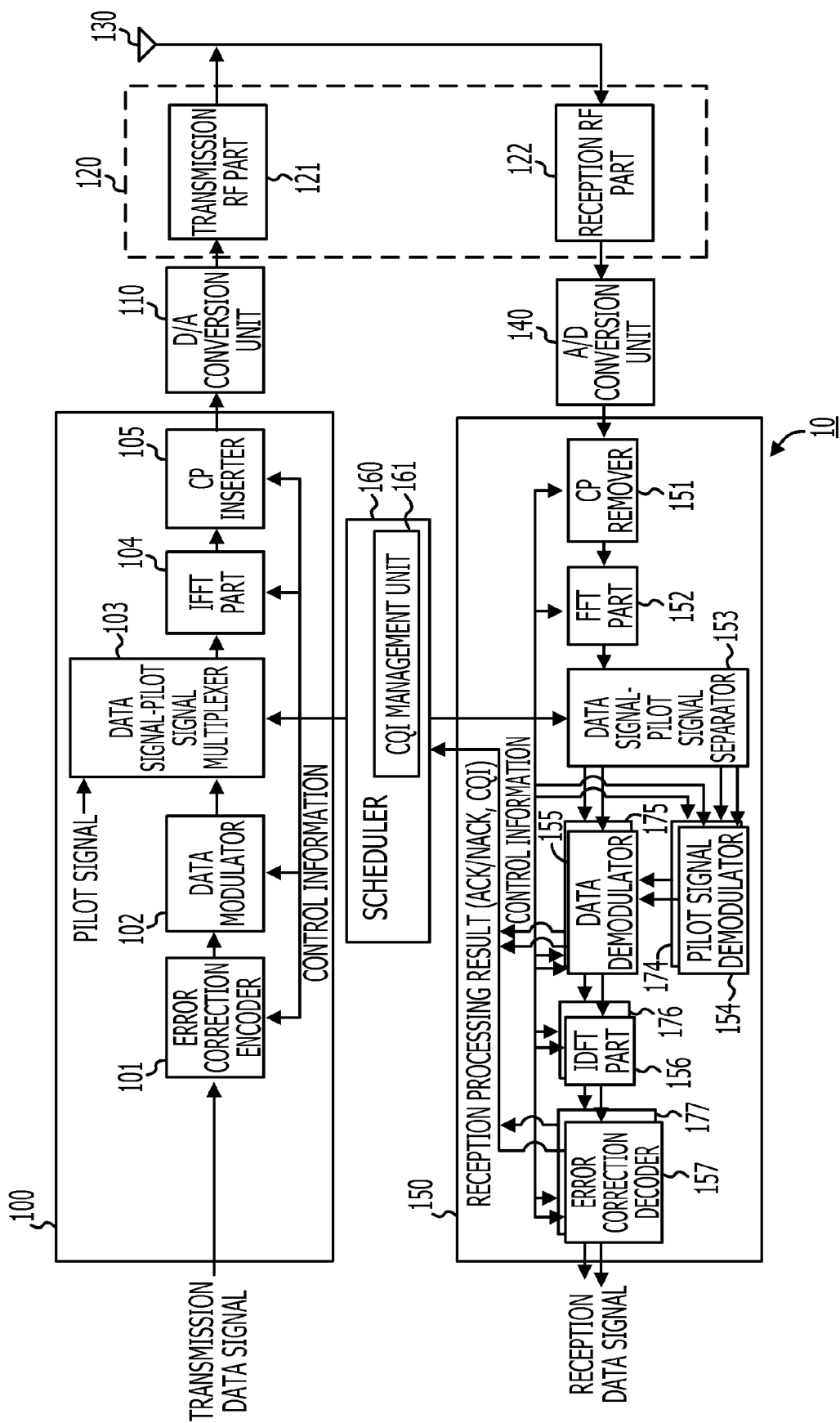
FIG. 12 illustrates another example of the configuration of the wireless base station apparatus according to the second embodiment.

Alternatively, two or more error correction decoders 157, etc. may be arranged in parallel in the base station 10, as in the first embodiment, to perform the parallel reception processing. FIG. 12 illustrates an example of the configuration of the base station 10 in such a case. Referring to FIG. 12, the base station 10 further includes a second pilot signal demodulator 174, a second data demodulator 175, a second IDFT part 176, and a second error correction decoder 177, in addition to the components in FIG. 10. For example, the second pilot signal demodulator 174, the second data demodulator 175, the second IDFT part 176, and the second error correction decoder 177 perform the reception processing through either the PUSCH or the PUCCH, and the pilot signal demodulator 154, the data demodulator 155, the IDFT part 156, and the error correction decoder 157 perform the reception processing through the remaining channel.

<Third Embodiment>

Figure 13:
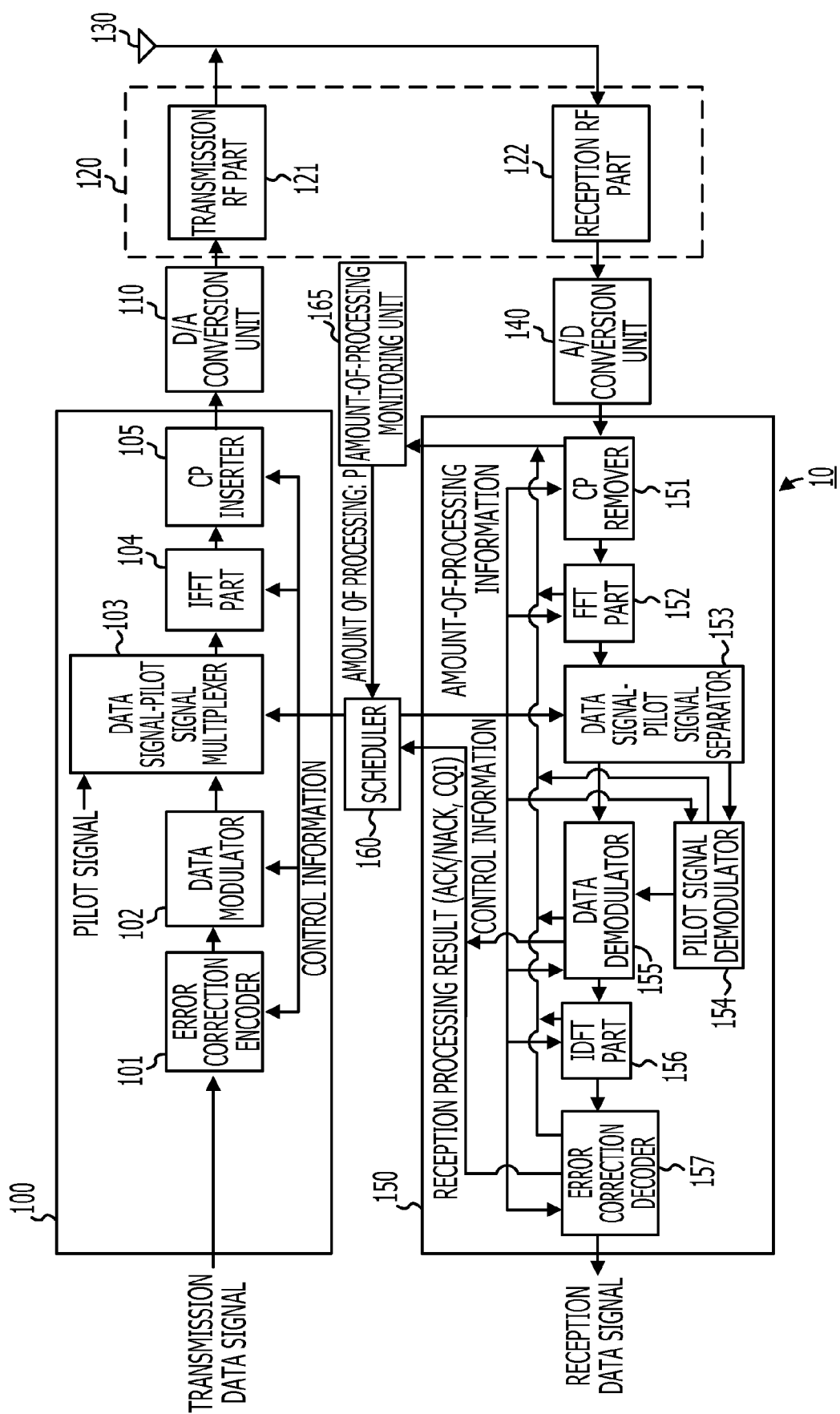
FIG. 13 illustrates an example of the configuration of a wireless base station apparatus according to a third embodiment of the present invention.

A third embodiment of the present invention will now be described. FIG. 13 illustrates an example of the configuration of the base station 10 according to the third embodiment.

Referring to FIG. 13, the base station 10 further includes an amount-of-processing monitoring unit 165, in addition to the components in FIG. 2.

The amount-of-processing monitoring unit 165 acquires information about the amount of processing from the components in the reception unit 150 (the CP remover 151, the FFT part 152, the data signal-pilot signal separator 153, the pilot signal demodulator 154, the data demodulator 155, the IDFT part 156, and the error correction decoder 157) to calculate an amount of processing (P). The amount of processing (P) corresponds to, for example, the load factor of the processor and also indicates the operating ratio per unit time. The amount-of-processing monitoring unit 165 may monitor each component in the reception unit 150 to acquire the amount of processing for a certain time in each component in order to calculate the entire amount of processing (P). The amount-of-processing monitoring unit 165 supplies the amount of processing (P) to the scheduler 160. The scheduler 160 performs processing described below on the basis of the amount of processing (P).

The same example of the configuration and the same exemplary sequence as those in the first embodiment, illustrated in FIG. 4 and FIGS. 6A and 6B, are applied to the mobile station 20 in the third embodiment. It is assumed that the base station 10 has transmitted a data signal (PDSCH) to the mobile station 20.

Figure 14:
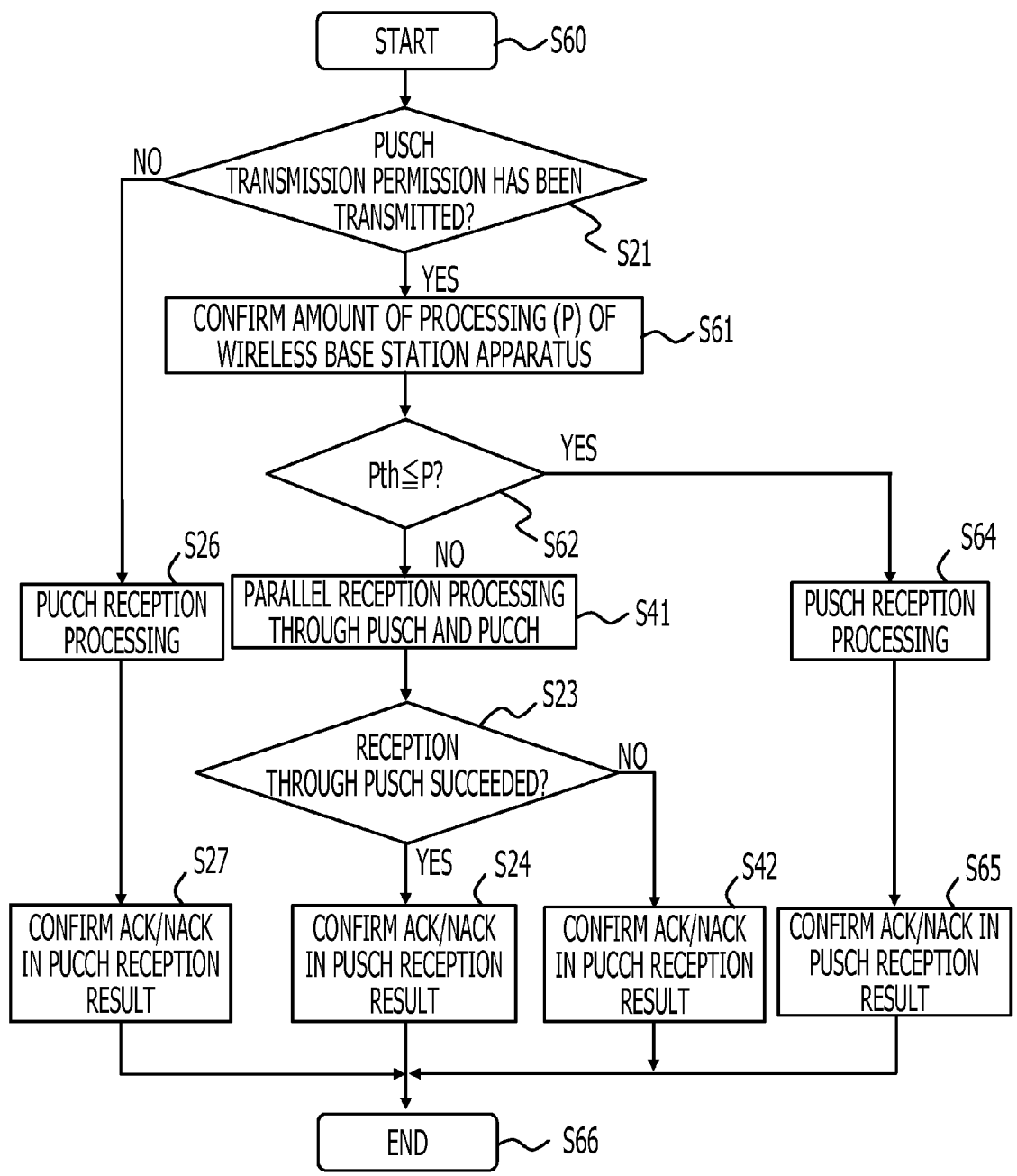
FIG. 14 illustrates an exemplary operational process in the wireless base station apparatus in the third embodiment.

FIG. 14 illustrates an exemplary operational process in the base station 10 in the third embodiment. Referring to FIG. 14, in Operation S60, the base station 10 starts the process. In Operation S21, the base station 10 determines whether a permission to transmit through the PUSCH has been transmitted to the mobile station 20.

If a permission to transmit through the PUSCH has been transmitted to the mobile station 20 (YES in Operation S21), in Operation S61, the base station 10 confirms the amount of processing (P) in the base station 10. For example, in the base station 10, the amount-of-processing monitoring unit 165 calculates the amount of processing (P) in the reception unit 150 and supplies the calculated amount of processing (P) to the scheduler 160 to confirm the amount of processing (P).

In Operation S62, the base station 10 determines whether the amount of processing (P) is higher than or equal to a threshold value Pth. For example, the scheduler 160 determines whether the amount of processing (P) is higher than or equal to the threshold value Pth that is held in advance.

If the amount of processing (P) is higher than or equal to the threshold value Pth (YES in Operation S62), in Operation S64, the base station 10 performs the reception processing to the data signal, etc. received through the PUSCH. When the amount of processing (P) is higher than or equal to the threshold value Pth, the amount of reception processing in the base station 10 is higher than a certain value and the number of the mobile stations 20 supported by the base station 10 is also larger than a certain number. When the number of the mobile stations 20 targeted for the reception processing is larger than the certain number, the number of the mobile stations 20 that use the PUSCH to transmit the data signal, etc. is larger than a certain number. Accordingly, when the number of the mobile stations 20 that use the PUSCH to transmit the data signal, etc. is larger than the certain number and the probability of using the PUSCH is higher than a certain value, the base station 10 performs the reception processing through the PUSCH.

In Operation S65, the base station 10 confirms the ACK or the NACK received through the PUSCH. In Operation S66, the base station 10 terminates the process.

If the amount of processing (P) is lower than the threshold value Pth (NO in Operation S62), the base station 10 performs the parallel processing, as in the first embodiment. In this case, since the number of the mobile stations 20 supported by the base station 10 is smaller than a certain number, the base station 10 has enough capacity for the processing. Accordingly, in Operation S41, the base station 10 performs the parallel reception processing.

After the parallel reception processing (Operation S41), in Operation S23, the base station 10 determines whether the data signal, etc. transmitted through the PUSCH is successfully received. If the data signal, etc. transmitted through the PUSCH is successfully received (YES in Operation S23), in Operation S24, the base station 10 confirms the ACK or the NACK transmitted through the PUSCH. If the data signal, etc. transmitted through the PUSCH is not successfully received (NO in Operation S23), in Operation S42, the base station 10 confirms the ACK or the NACK received through the PUCCH. After the confirmation of the delivery result (Operations S24 and S42), in Operation S66, the base station 10 terminates the process.

If a permission to transmit through the PUSCH has not been transmitted to the mobile station 20 (NO in Operation S21), in Operation S26, the base station 10 performs the reception processing to the signal, etc. received through the PUCCH. In Operation S27, the base station 10 confirms the ACK or the NACK transmitted through the PUCCH. In Operation S66, the base station 10 terminates the process.

As described above, according to the third embodiment, the base station 10 performs the reception processing through the PUSCH (Operation S64) when the base station 10 does not have enough capacity for the processing while the base station 10 performs the parallel reception processing through the PUSCH and the PUCCH (Operation S41) when the base station 10 has enough capacity for the processing. Accordingly, since the base station 10 does not perform the parallel reception processing when the base station 10 does not have enough capacity for the processing, it is possible to reduce the amount of processing, the power consumption, etc., in the wireless communication system of the third embodiment, as in the second embodiment, compared with the parallel processing in the first embodiment. Consequently, it is possible to improve the throughput in the wireless communication system 1, as in the second embodiment. Furthermore, since the base station 10 can confirm the delivery result at an early stage in the third embodiment, as in the second embodiment, it is possible to improve the round trip time in the wireless communication system 1.

In the parallel reception processing (Operation S41), the pilot signal demodulator 154, the data demodulator 155, the IDFT part 156, and the error correction decoder 157 in the base station 10 perform the processing at a processing speed allowing the signals, etc. transmitted through the PUSCH and the PUCCH at different frequencies to be received in parallel, as in the first embodiment.

Figure 15:
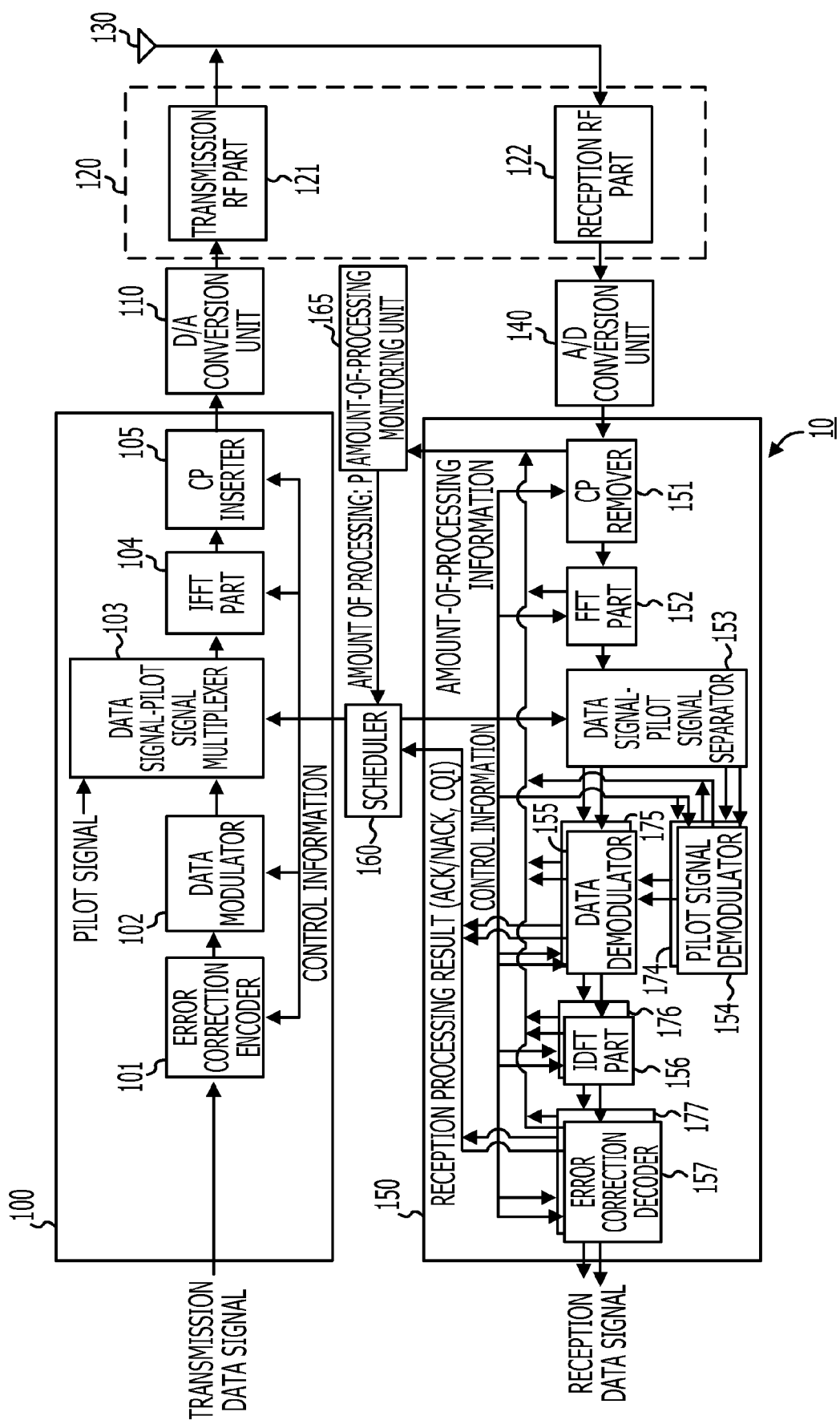
FIG. 15 illustrates another example of the configuration of the wireless base station apparatus according to the third embodiment.

Alternatively, as illustrated in FIG. 15, two or more pilot signal demodulators 154, etc. may be arranged in parallel in the base station 10. Referring to FIG. 15, the base station 10 further includes a second pilot signal demodulator 174, a second data demodulator 175, a second IDFT part 176, and a second error correction decoder 177, in addition to the components in FIG. 13, as in the first embodiment. For example, the second pilot signal demodulator 174, the second data demodulator 175, the second IDFT part 176, and the second error correction decoder 177 perform the reception processing for the data signal, etc. received through either the PUSCH or the PUCCH, and the pilot signal demodulator 154, the data demodulator 155, the IDFT part 156, and the error correction decoder 157 perform the reception processing for the data signal, etc. received through the remaining channel.

<Fourth Embodiment>

Figure 16:
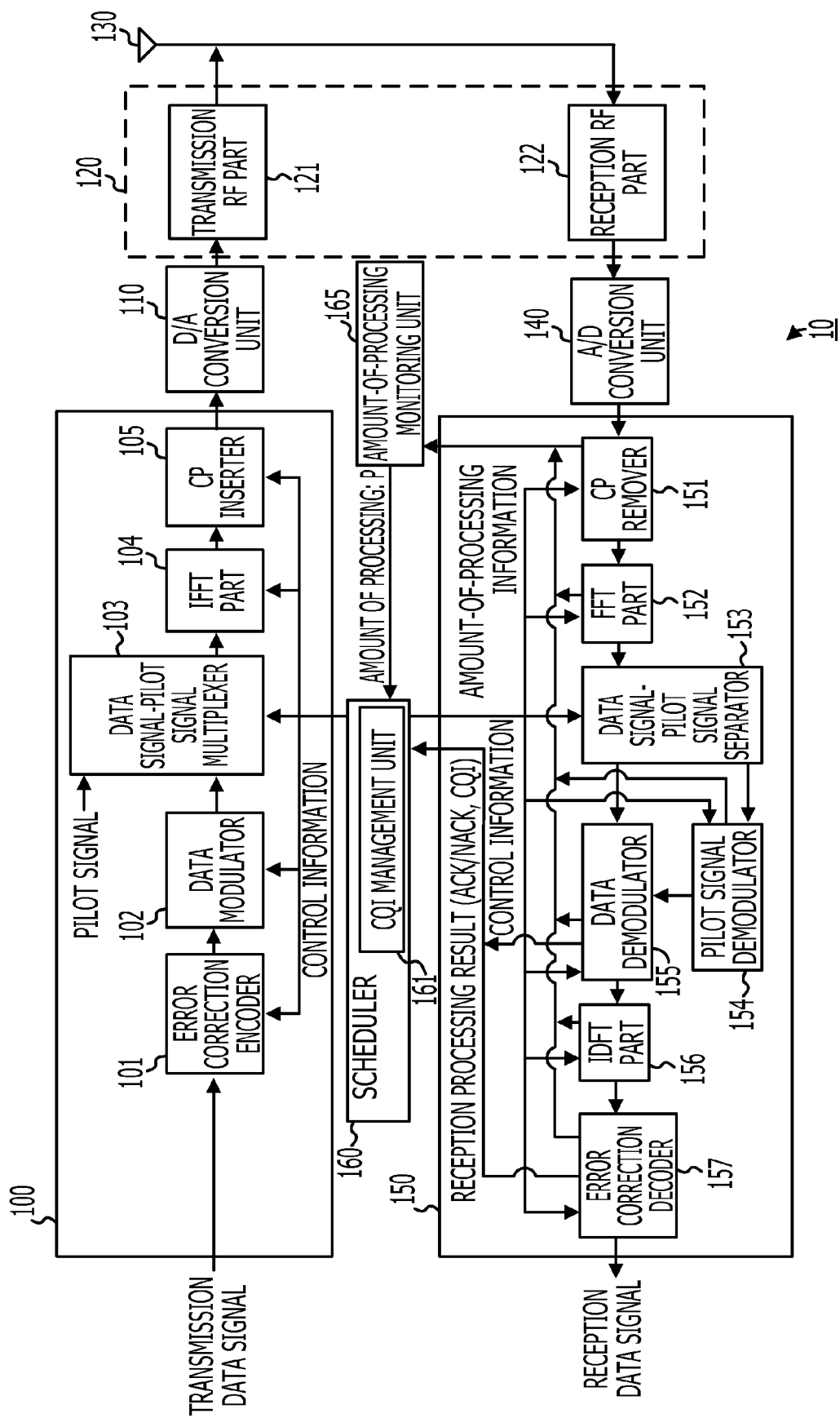
FIG. 16 illustrates an example of the configuration of a wireless base station apparatus according to a fourth embodiment of the present invention.
Figure 17:
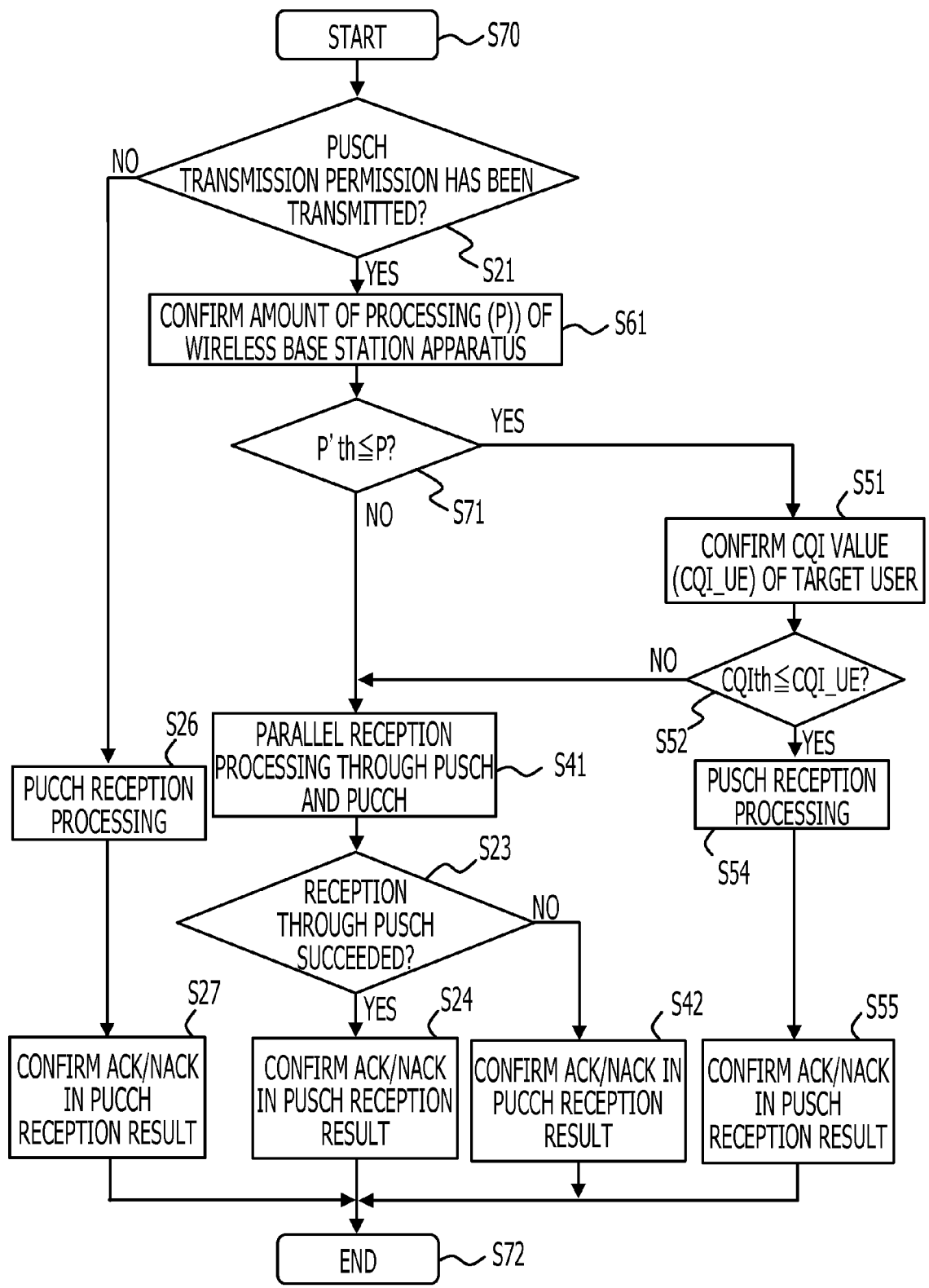
FIG. 17 illustrates an exemplary operational process in the wireless base station apparatus in the fourth embodiment.

A fourth embodiment of the present invention will now be described. FIG. 16 illustrates an example of the configuration of the base station 10 according to the fourth embodiment. FIG. 17 illustrates an exemplary operational process in the base station 10 in the fourth embodiment. The same example of the configuration and the same exemplary sequence as those in the first embodiment, illustrated in FIG. 4 and FIGS. 6A and 6B, are applied to the mobile station 20 in the fourth embodiment. It is assumed that the base station 10 has transmitted a data signal (PDSCH) to the mobile station 20 also in the exemplary operational process in FIG. 17.

As illustrated in FIG. 16, the base station 10 further includes a CQI management unit 161 and an amount-of-processing monitoring unit 165, in addition to the components in FIG. 2.

The CQI management unit 161 holds the radio line quality (for example, the CQI) of the downlink transmitted from the mobile station 20 and compares the radio line quality with the threshold value CQIth that is held in advance, as in the second embodiment. The scheduler 160 performs processing described below on the basis of the result of the comparison.

The amount-of-processing monitoring unit 165 acquires information about the amount of processing from the components in the reception unit 150 (the CP remover 151, the FFT part 152, the data signal-pilot signal separator 153, the pilot signal demodulator 154, the data demodulator 155, the IDFT part 156, and the error correction decoder 157) to calculate the amount of processing (P), as in the third embodiment. The amount-of-processing monitoring unit 165 supplies the amount of processing (P) in the entire reception unit 150 to the scheduler 160.

The exemplary operational process in the fourth embodiment will now be described. Referring to FIG. 17, in Operation S70, the base station 10 starts the process. In Operation S21, the base station 10 determines whether a permission to transmit through the PUSCH has been transmitted to the mobile station 20. If a permission to transmit through the PUSCH has been transmitted to the mobile station 20 (YES in Operation S21), in Operation S61, the base station 10 confirms the amount of processing (P) in the base station 10.

In Operation S71, the base station 10 determines whether the amount of processing (P) is higher than or equal to a threshold value P'th. If the amount of processing (P) is higher than or equal to the threshold value P'th (YES in Operation S71), in Operation S51, the base station 10 confirms the CQI value (CQI_UE) of the mobile station 20 to be processed.

In Operation S52, the base station 10 determines whether the CQI value (CQI_UE) of the mobile station 20 is higher than or equal to the threshold value CQIth. If the CQI value (CQI_UE) of the mobile station 20 is higher than or equal to the threshold value CQIth (YES in Operation S52), in Operation S54, the base station 10 performs the reception processing to the data signal, etc. received through the PUSCH.

In Operation S55, the base station 10 confirms the ACK or the NACK received in the reception processing through the PUSCH. In operation S72, the base station 10 terminates the process.

If the CQI value (CQI_UE) of the mobile station 20 is lower than the threshold value CQIth (NO in Operation S52), in Operation S41, the base station 10 performs the parallel reception processing.

In Operation S23, the base station 10 determines whether the data signal, etc. transmitted through the PUSCH is successfully received. If the data signal, etc. transmitted through the PUSCH is successfully received (YES in Operation S23), in Operation S24, the base station 10 confirms the ACK or the NACK received through the PUSCH. If the data signal, etc. transmitted through the PUSCH is not successfully received (NO in Operation S23), in Operation S42, the base station 10 confirms the ACK or the NACK received through the PUCCH. After the confirmation of the delivery result (Operations S24 and S42), in Operation S72, the base station 10 terminates the process.

If a permission to transmit through the PUSCH has not been transmitted to the mobile station 20 (NO in Operation S21), in Operation S26, the base station 10 performs the reception processing to the control signal, etc. received through the PUCCH. In Operation S27, the base station 10 confirms the ACK or the NACK received through the PUCCH. In Operation S72, the base station 10 terminates the process.

As described above, according to the fourth embodiment, even if the amount of processing (P) is higher than or equal the threshold value P'th, the base station 10 performs the parallel reception processing when the radio line quality of the downlink is lower than a certain value and performs the reception processing through the PUSCH when the radio line quality is higher than or equal to the certain value. Accordingly, since there are cases in which the parallel reception processing is not performed (YES in Operation S71 and YES in Operation S52) in the wireless communication system 1, it is possible to reduce the amount of processing, etc., compared with the parallel processing in the first embodiment, and to improve the throughput, as in the third embodiment. In addition, since the base station 10 can acquire the delivery result at an early stage, as in the third embodiment, it is possible to improve the round trip time in the entire wireless communication system 1.

Furthermore, since there are cases in which the base station 10 can receive the delivery result at an early stage, compared with the third embodiment, by confirming the radio line quality (Operations S51 and S52) even if the amount of processing (P) is higher than or equal to the threshold value P'th, it is possible to improve the transmission accuracy in the retransmission control.

The threshold value P'th of the amount of processing (P) may be set to a value that is lower than the threshold value Pth in the third embodiment (Pth>P'th). There are cases in which the base station 10 desirably performs the parallel reception processing through the PUSCH and the PUCCH in terms of the early confirmation of the delivery result when the radio line quality is lower than a certain value, even if the amount of processing (P) is higher than or equal the threshold value. The threshold value P'th can be set to such a value to increase the number of the mobile stations 20 to be processed, compared with the third embodiment.

Figure 18:
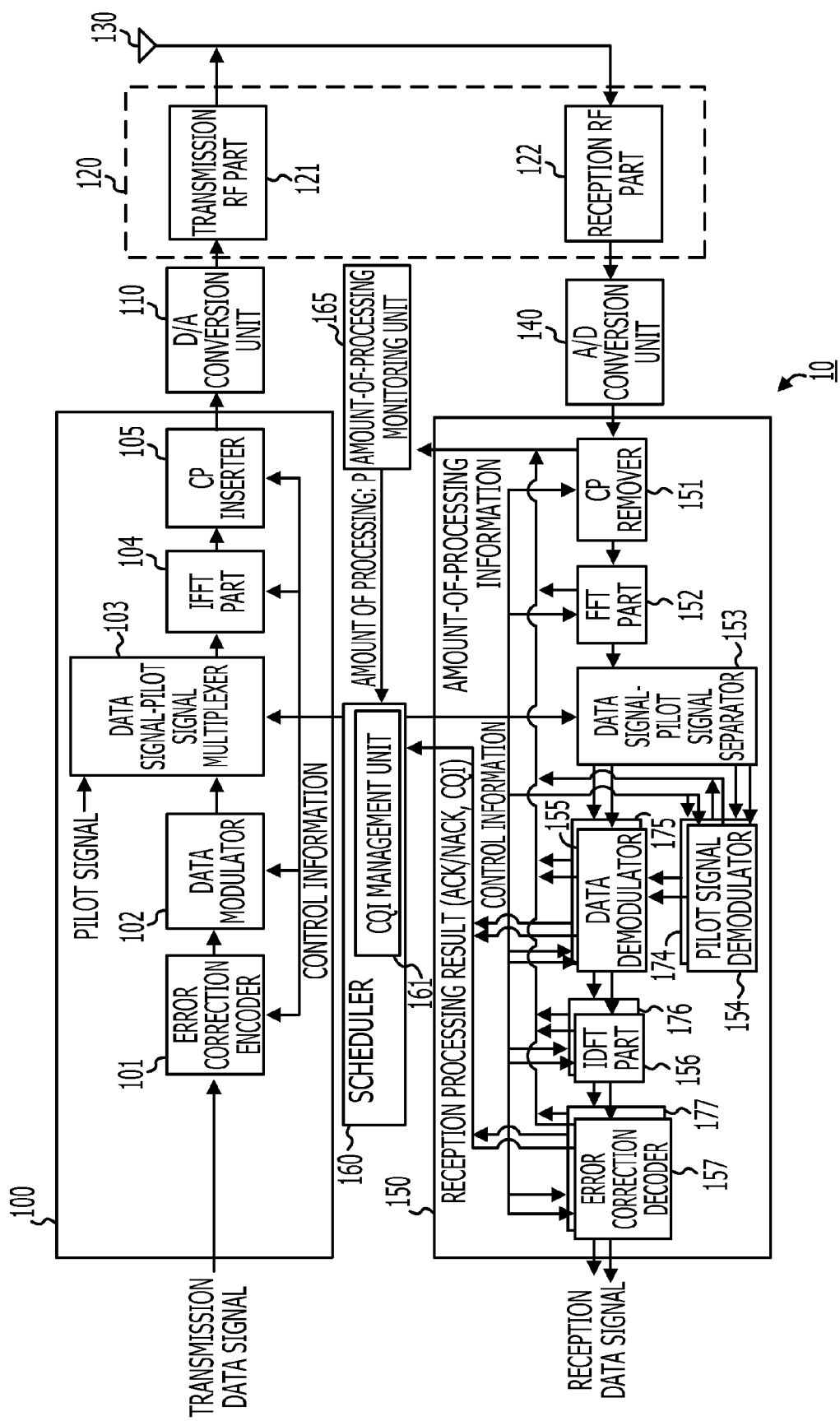
FIG. 18 illustrates another example of the configuration of the wireless base station apparatus according to the fourth embodiment.

In the parallel reception processing (Operation S41), the pilot signal demodulator 154, the data demodulator 155, the IDFT part 156, and the error correction decoder 157 in the base station 10 perform the processing at a processing speed allowing the signals, etc. transmitted through the PUSCH and the PUCCH at different frequencies to be processed in parallel. Alternatively, as illustrated in FIG. 18, the base station 10 may include a second pilot signal demodulator 174, a second data demodulator 175, a second IDFT part 176, and a second error correction decoder 177, in addition to the components in FIG. 16, to receive the signals, etc. having different frequencies in parallel.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that various changes, substitutions, and alternations could be made hereto without departing from the spirit and scope of the invention.

The invention claimed is:

1. A wireless base station apparatus performing wireless communication with at least one mobile station apparatus, the wireless base station apparatus comprising:
a transmitter configured to transmit data to the mobile station apparatus;
a receiver configured to receive a delivery result for the data from the mobile station apparatus; and
a processor configured to determine whether reception processing through a first channel is performed or parallel reception processing through the first channel and a second channel is performed on the basis of a radio line quality between the wireless base station apparatus and the mobile station apparatus or an amount of processing in the receiver if the transmitter transmits a permission notification to the mobile station apparatus permitting a transmission through the first channel,
wherein the receiver performs the reception processing in accordance with a result of the determination to receive the delivery result transmitted through the first channel or the second channel, and
wherein the receiver acquires the delivery result by the reception processing through the second channel if the reception processing through the first channel and the second channel is performed and a signal transmitted through the first channel is not received, and acquires the delivery result by the reception processing through the first channel if the parallel reception processing through the first channel and the second channel is performed and a signal transmitted through the first channel is received.

2. The wireless base station apparatus according to claim 1, wherein the processor selects the reception processing through the first channel if the radio line quality or the amount of processing is higher than or equal to a corresponding threshold value and selects the parallel reception processing through the first channel and the second channel if the radio line quality or the amount of processing is lower than the corresponding threshold value.

3. The wireless base station apparatus according to claim 2, wherein the first channel is available by permission of the wireless base station apparatus, and the second channel is allocated to each mobile station apparatus in advance.

4. The wireless base station apparatus according to claim 3, wherein the first channel is a Physical Uplink Shared Channel, and the second channel is a Physical Uplink Control Channel.

5. The wireless base station apparatus according to claim 1, wherein the processor selects the parallel reception processing through the first channel and the second channel if the amount of processing is higher than or equal to a first threshold value and the radio line quality is lower than a second threshold value and selects the reception processing through the first channel if the amount of processing is higher than or equal to the first threshold value and the radio line quality is higher than or equal to the second threshold value.

6. The wireless base station apparatus according to claim 5, wherein the processor selects the parallel reception processing through the first channel and the second channel if the amount of processing is lower than the first threshold value.

7. The wireless base station apparatus according to claim 1, wherein the processor selects reception processing through the second channel if the permission notification is not transmitted to the mobile station apparatus.

8. The wireless base station apparatus according to claim 1, wherein the transmitter transmits a pilot signal to the mobile station apparatus, and
wherein the receiver receives the radio line quality, which the mobile station apparatus measures on the basis of the pilot signal, from the mobile station apparatus.

9. The wireless base station apparatus according to claim 8, wherein the radio line quality is a value indicated by a Channel Quality Indicator.

10. The wireless base station apparatus according to claim 1, wherein the delivery result is an affirmative result indicating that the mobile station apparatus successfully receives the data or a negative result indicating that the mobile station apparatus does not successfully receive the data.

11. A mobile station apparatus performing wireless communication with a wireless base station apparatus, the mobile station apparatus comprising:
a receiver configured to receive data transmitted from the wireless base station apparatus; and
a transmitter configured to transmit a delivery result for the data through a second channel if a permission notification permitting transmission through a first channel is not received from the wireless base station apparatus,
wherein the wireless base station apparatus acquires the delivery result by reception processing through the second channel if the reception processing through the first channel and the second channel is performed and a signal transmitted through the first channel is not received, and acquires the delivery result by the reception processing through the first channel if parallel reception processing through the first channel and the second channel is performed and a signal transmitted through the first channel is received.

12. A wireless communication method in a wireless base station apparatus that includes a transmitter transmitting data to a mobile station apparatus, a receiver receiving a delivery result for the data from the mobile station apparatus, and a control processor, and that performs wireless communication with the mobile station apparatus, the method comprising the steps of:

determining by the processor whether reception processing through a first channel is performed or parallel reception processing through the first channel and a second channel is performed on the basis of a radio line quality between the wireless base station apparatus and the mobile station apparatus or an amount of processing in the receiver if the transmitter transmits a permission notification to the mobile station apparatus permitting a transmission through the first channel, and performing the reception processing in accordance with a result of the determination to receive the delivery result transmitted through the first channel or the second channel by the receiver, wherein the receiver acquires the delivery result by the reception processing through the second channel if the reception processing through the first channel and the second channel is performed and a signal transmitted through the first channel is not received, and acquires the delivery result by the reception processing through the first channel if the parallel reception processing through the first channel and the second channel is performed and a signal transmitted through the first channel is received.

13. A wireless communication system in which wireless communication between a wireless base station apparatus and at least one mobile station apparatus is performed, wherein the wireless base station apparatus includes a transmitter configured to transmit data to the mobile station apparatus;

a receiver configured to receive a delivery result for the data from the mobile station apparatus; and a processor configured to determine whether reception processing through a first channel is performed or parallel reception processing through the first channel and a second channel is performed on the basis of a radio line quality between the wireless base station apparatus and the mobile station apparatus or an amount of processing in the receiver if the transmitter transmits a permission notification to the mobile station apparatus permitting a transmission through the first channel, wherein the receiver performs the reception processing in accordance with a result of the determination to receive the delivery result transmitted through the first channel or the second channel, wherein the mobile station apparatus includes a transmitter that transmits the delivery result through the first channel if the permission notification is received and transmits the delivery result through the second channel if the permission notification is not received, and wherein the receiver acquires the delivery result by the reception processing through the second channel if the reception processing through the first channel and the second channel is performed and a signal transmitted through the first channel is not received, and acquires the delivery result by the reception processing through the first channel if the parallel reception processing through the first channel and the second channel is performed and a signal transmitted through the first channel is received.

\* \* \* \* \*